US007590972B2

(12) United States Patent
Axelrod et al.

(10) Patent No.: US 7,590,972 B2
(45) Date of Patent: Sep. 15, 2009

(54) ROLE-ORIENTED DEVELOPMENT ENVIRONMENT

(75) Inventors: Jeffrey Axelrod, San Francisco, CA (US); Sameer Shalaby, San Francisco, CA (US); Jay Gitterman, Palo Alto, CA (US); William Herndon, San Francisco, CA (US); Jie Deng, Fremont, CA (US)

(73) Assignee: Cogency Software, Inc., Burlingame, CA (US)

( * ) Notice: Subject to any disclaimer, the term of this patent is extended or adjusted under 35 U.S.C. 154(b) by 567 days.

(21) Appl. No.: 10/975,975

(22) Filed: Oct. 28, 2004

(65) Prior Publication Data

US 2006/0095276 A1 May 4, 2006

(51) Int. Cl.
*G06F 9/44* (2006.01)
*G06F 17/30* (2006.01)

(52) U.S. Cl. .......................................... 717/117; 707/9

(58) Field of Classification Search ......... 717/100-103, 717/110-113, 105, 104, 117; 705/1, 30, 705/35, 8; 715/503, 530; 707/9
See application file for complete search history.

(56) References Cited

U.S. PATENT DOCUMENTS

| | | | | |
|---|---|---|---|---|
| 6,473,748 | B1 * | 10/2002 | Archer | 706/45 |
| 6,959,268 | B1 * | 10/2005 | Myers, Jr. et al. | 703/6 |
| 6,985,895 | B2 * | 1/2006 | Witkowski et al. | 707/3 |
| 7,155,700 | B1 * | 12/2006 | Sadhu et al. | 717/103 |
| 7,398,512 | B2 * | 7/2008 | Martin et al. | 717/105 |
| 2005/0138031 | A1 * | 6/2005 | Wefers | 707/9 |
| 2007/0179828 | A1 * | 8/2007 | Elkin et al. | 705/8 |

OTHER PUBLICATIONS

International Search Report and Written Opinion for International Application No. PCT/US05/38128, mailed on Dec. 21, 2007.

"TWiki—Projects—CJANDataDictionary," http://wiki.java.net/bin/view/Projects/CJANDataDictionary accessed on Jul. 1, 2004.

ExoSonic Financial Server, "Powering the core financial information circulatory system across multiple channels," Technical Datasheet Version 2.0., 2003.

SunSoft Developer Products, "Data Visualization During Program Execution," accessed on Jul. 1, 2004.

SunGard, "Solutions for: Asset Managers," http://www.sungard.com/products_and _services/for_asset_managers.htm accessed on Jul. 1, 2004.

* cited by examiner

*Primary Examiner*—Tuan Anh Vu
(74) *Attorney, Agent, or Firm*—Ernest J. Beffel, Jr.; Haynes Beffel & Wolfeld, LLP

(57) ABSTRACT

This invention relates to a business application development and execution environment that recognizes and supports various development and user roles. Aspects of the method and system are adapted to builders, assemblers, power users and end users.

14 Claims, 16 Drawing Sheets
(12 of 16 Drawing Sheet(s) Filed in Color)

ROLE-ORIENTED DEVELOPMENT ENVIRONMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates to a business application development and execution environment that recognizes and supports various development and user roles. Aspects of the method and system are adapted to builders, assemblers, power users and end users of business applications.

The advent of spreadsheets and the proliferation of disparate and distributed data sources have transformed business analysis. A resourceful analyst may seek out information from a dozen disparate sources, including spreadsheets, databases, online sources, reports and the like. This typically is a manual process that involves spreadsheets, reports and paper trails. This manual process is often incomplete or inaccurate, as some data sources may be missing, inaccurately entered, poorly correlated, short of being enterprise-wide, or outdated by the time the data is analyzed. While spreadsheets are handy for analyzing data, they provide little assistance in collecting data.

The calculations produced by spreadsheets may be numbers that are relatively difficult to interpret. An analyst faced with presenting data to executives will typically prepare charts and graphs to express the numbers generated by spreadsheets. Spreadsheets are not well adapted to codifying institutional knowledge about how to interpret the numbers that they generate.

Integrated development environments (IDE), which are more powerful than spreadsheets, typically are directed to builders or computer programmers. For instance, Forte, is an IDE available from Sun Microsystems that allows builders to see the results of their programs as the programs run and are debugged. Like other IDE's, Forte expects the user to write program code, which requires familiarity with programming and with proper manipulation of data sources.

An early version of Cogency Software's Cogency Wisdom product, released more than a year before filing of this patent application, provided an IDE directed to builders. It provided a visual interface for entry of code that implemented rules and allowed execution without compiling in an interpretive execution environment. This made it easier to support business analysis, but the earlier version was not a product suitable for power users or assemblers, as it required a builder-level understanding of data and coding.

At the other end of the project-to-product spectrum, service-oriented organizations, such as SunGard or Oracle make it their business to deliver complete, customized applications. These service-oriented organizations work with the client, such as a business analyst, to develop requirements or adapt off-the-shelf packages to customer requirements. They develop software and modify existing software to meet the needs outlined by the client. They typically are working with builder-level tools that are not readily accessible to clients, much less to client power users or application assemblers.

Some organizations develop their own analysis tools on a multi-vendor basis. These multi-vendor solutions are vulnerable to ongoing industry consolidation, for instance efforts by Oracle to take over PeopleSoft for the latter's client base, not for its technology.

Therefore, an opportunity arises to provide better tools for analytical business applications. A layered environment could be provided, adapted to the respective expertises of builders, assemblers, power users, ordinary users and executives. Tools could be provided to builders with which to build data encapsulation objects, from which assemblers could develop analytical applications. Assemblers could implement analytical applications without needing to be familiar with details of obtaining data from disparate data sources and without having to explain to builders their ever-changing and ever-evolving requirements.

SUMMARY OF THE INVENTION

This invention relates to a business application development and execution environment that recognizes and supports various development and user roles. Aspects of the method and system are adapted to builders (e.g., programmers), assemblers (e.g., business analysts), power users and end users. Particular aspects of the present invention are described in the claims, specification and drawings.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

Figure 19:
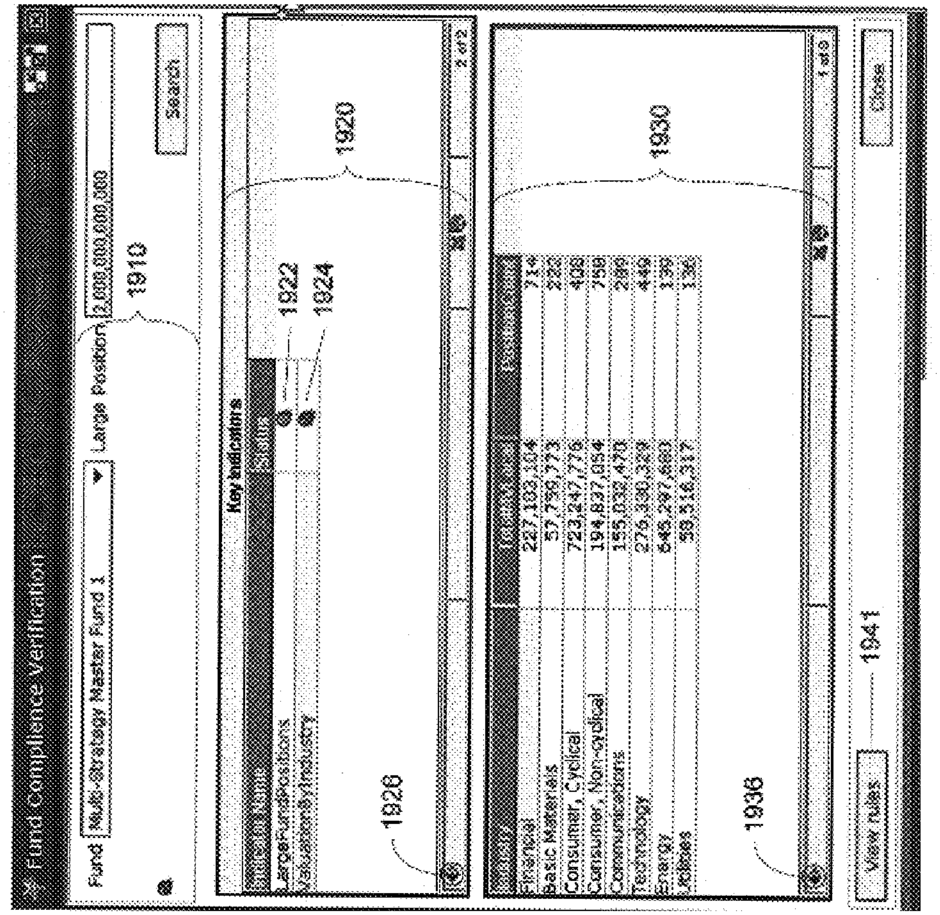

A completed report card, entitled "Fund Compliance Verification" is illustrated by FIG. 19.

Figure 20:
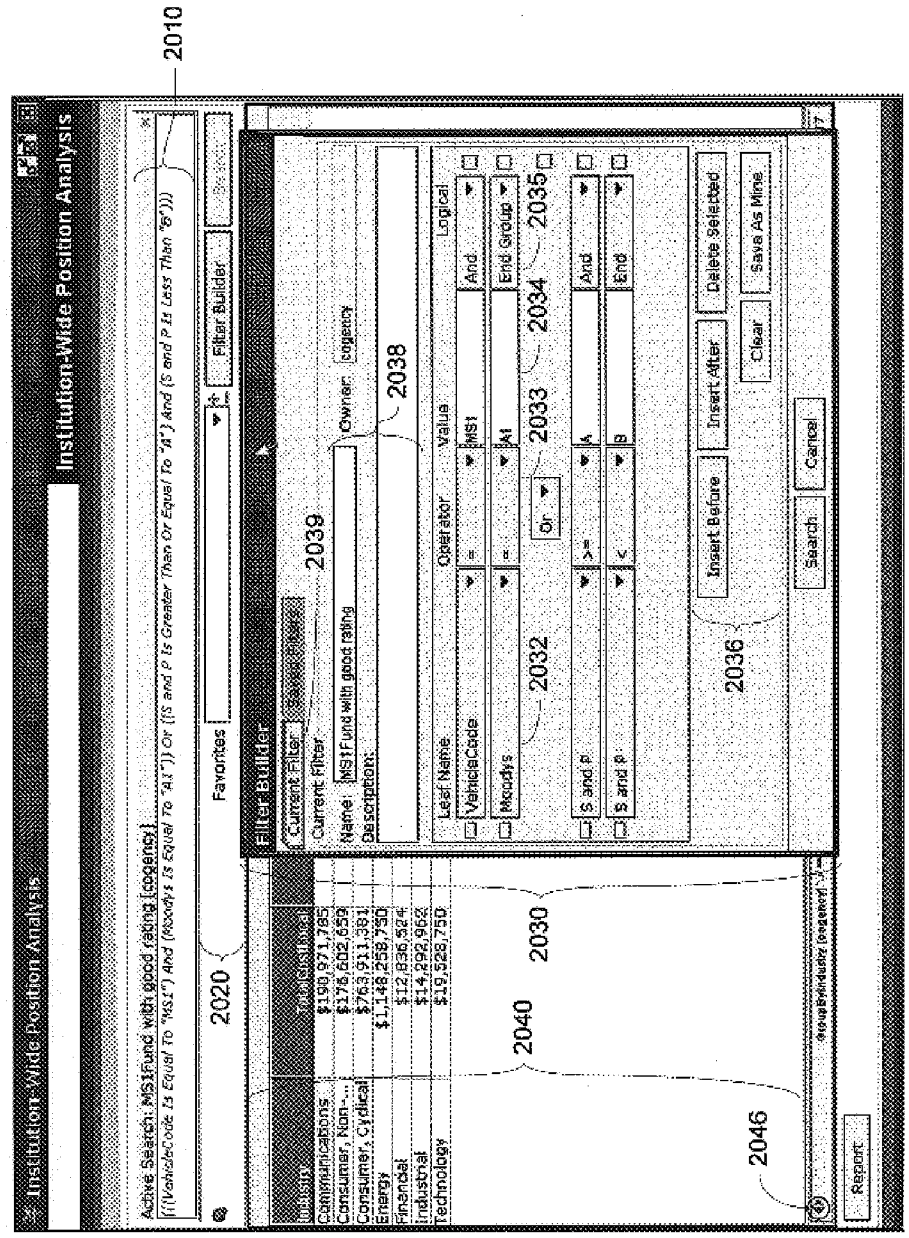
Figure 21:
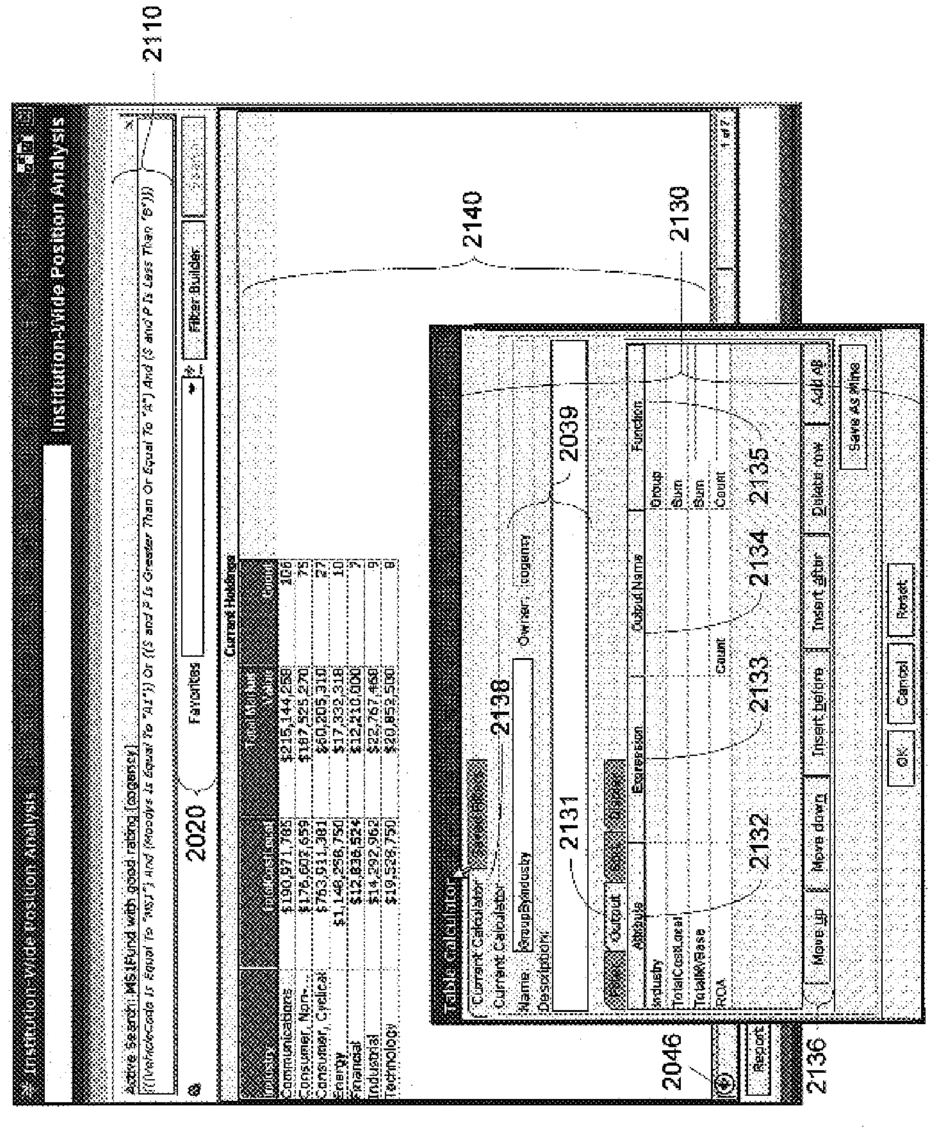

Another application of filters and calculators to business data encapsulation objects is illustrated by FIGS. 20-21.

Figure 22:
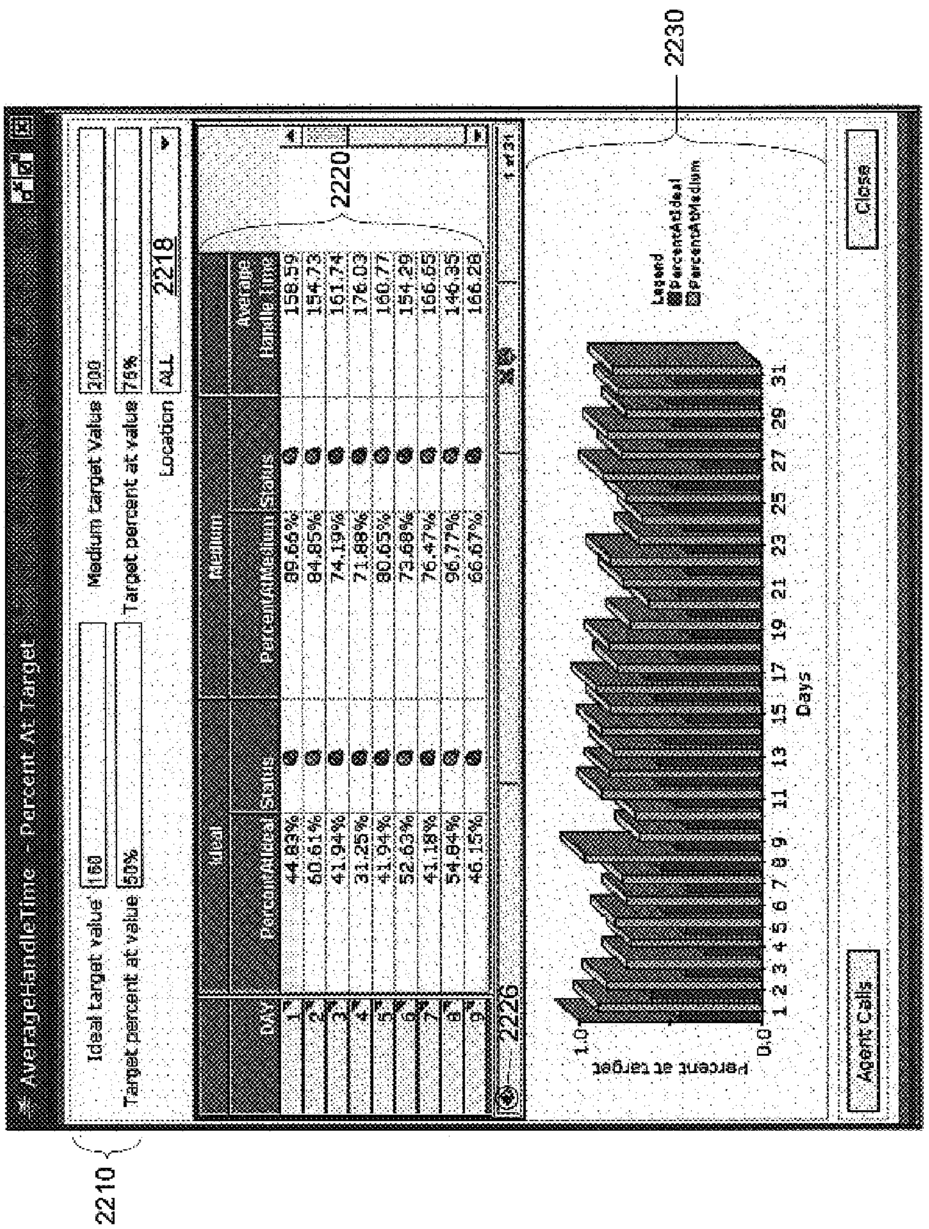

FIG. 22 illustrates a relatively elaborate report with report card and graph features for a call-center application.

DETAILED DESCRIPTION

The following detailed description is made with reference to the figures. Preferred embodiments are described to illustrate the present invention, not to limit its scope, which is defined by the claims. Those of ordinary skill in the art will recognize a variety of equivalent variations on the description that follows.

The assignee of this application has developed a software system that helps enterprises face the mounting challenges of monitoring and reducing enterprise risk by building analytical and metrics-monitoring applications. Those involved in monitoring and reducing enterprise risk will understand that several factors contribute to the increasing need for analytical tools. Due to uncertainty in economic climate, government agencies are instituting regulations to protect consumers, investors and citizens. Companies are required to prove that they are in compliance with these regulations. Competition forces business managers to share information across departments, in order to improve the speed and quality of their decisions. Mergers and acquisitions increase the complexities of information technology (IT) environments, as disparate systems are brought into an organization. These disparate systems introduce new needs to aggregate information. Uncertainty about the stability of suppliers, clients and strategic partners motivates managers to have precise knowledge about counterparty exposures. External information sources for news, prices, weather, credit ratings and other information are proliferating with expansion of the Internet and reduced communication costs. Due to these factors and others, the assignee's development of a software system that helps enterprises face the mounting challenges of monitoring and reducing enterprise risk by providing flexible access to and analysis of data is timely.

Analysis tools described herein sit on top of existing infrastructures, augmenting instead of replacing them. Of course, a supplier of infrastructure could incorporate tools described herein into a data infrastructure and analysis system, providing access to both their own infrastructure and other data sources. Aspects of these tools aggregate data according to business requirements and can provide an enterprise-scale, secure environment.

In one embodiment, software may be web-based, developed in Java and deployed in an intranet/Internet environment, taking full advantage of Web technologies such as browser user interfaces, Web security, and the robustness and scalability of application servers. Analysis tools that augment infrastructures may impose relatively little resource overhead for effective monitoring and management environment. One platform that may be used is the industry standard J2EE platform supported by Sun Microsystems. A collaborative peer-to-peer environment may be capable of scaling to large numbers of users and monitoring large transaction volumes in real time. Power users and analysts may customize, extend or build business monitoring applications using some embodiments of the software. Security may be more readily implemented in an integrated environment than with a multi-vendor solution.

Components of a software system may provide connectivity for users, access to disparate data, a rules engine for implementing declarative processes, a process flow engine for transforming data through multiple steps, presentation mediums for visually interpreting numbers, alert distributions, and the like. Users assign rules as application builders (programmers). Assemblers, power users and end-users may use these components to define where data comes from, what data to access, how business rules apply to the data, how business process flows are implemented and the look and feel of the user interface. To distinguish among these roles, we designate builders as persons who design the application infrastructure and physical data sources. This typical includes defining the mapping of business objects to SQL or to XML source data or other data sources like Excel worksheets, flat files, etc. A builder also may make system tuning decisions such as what data should be cached, what scheduled jobs should run when, etc. An assembler uses components built by the application builder. Assemblers design and build screens, business rules and workflows. Power users create rules, reports, custom searches, data views, custom rule sets, real time manipulations of application data. Power users may enrich applications without going back to the application builder for new components. Users or end-users use finished applications to accomplish business tasks. The user runs reports, schedules rule-sets to run with custom criteria. A modest amount of training advances a user to power user status.

Layers of abstraction are adapted to presenting an interface that takes advantage of the respective expertise of assemblers, power users, ordinary users and executives. In one embodiment, there are several levels of the abstraction. A physical data source abstraction recognizes the characteristics of a data source such as an SQL database or Excel spreadsheet. A logical data source provides a physical mapping to a physical data source. Disparate data sources with different characteristics may have consistent presentations as logical data sources. A Qube is a usable business object, which builds on one or more logical data sources. A rule applies to a category of Qubes on which it can operate. The category of Qubes may be called a source data type. A so-called map, which describes a business process flow, refers to rules and Qubes and to logical data sources. A so-called canvas is a specification of a user interface, such as a dashboard or collection of presentation media. Organizing software with these levels of layers of the abstraction can provided resilience to applications implemented in this framework. As a business changes, the changes can be accommodated quickly. For instance, changing a database from Sybase to Oracle, would result in a modification at the physical mapping and physical data source level, without any necessary modification of the logical data source. The same would be true of the data source change from Excel to SQL. A change in data feeds from a nightly price data feed to a real time, message bus price data feed could be similarly accommodated. Layers of the abstraction also may facilitate rapid and/or ad hoc response to requests for new data, new calculations or new perspectives.

Figure 1:
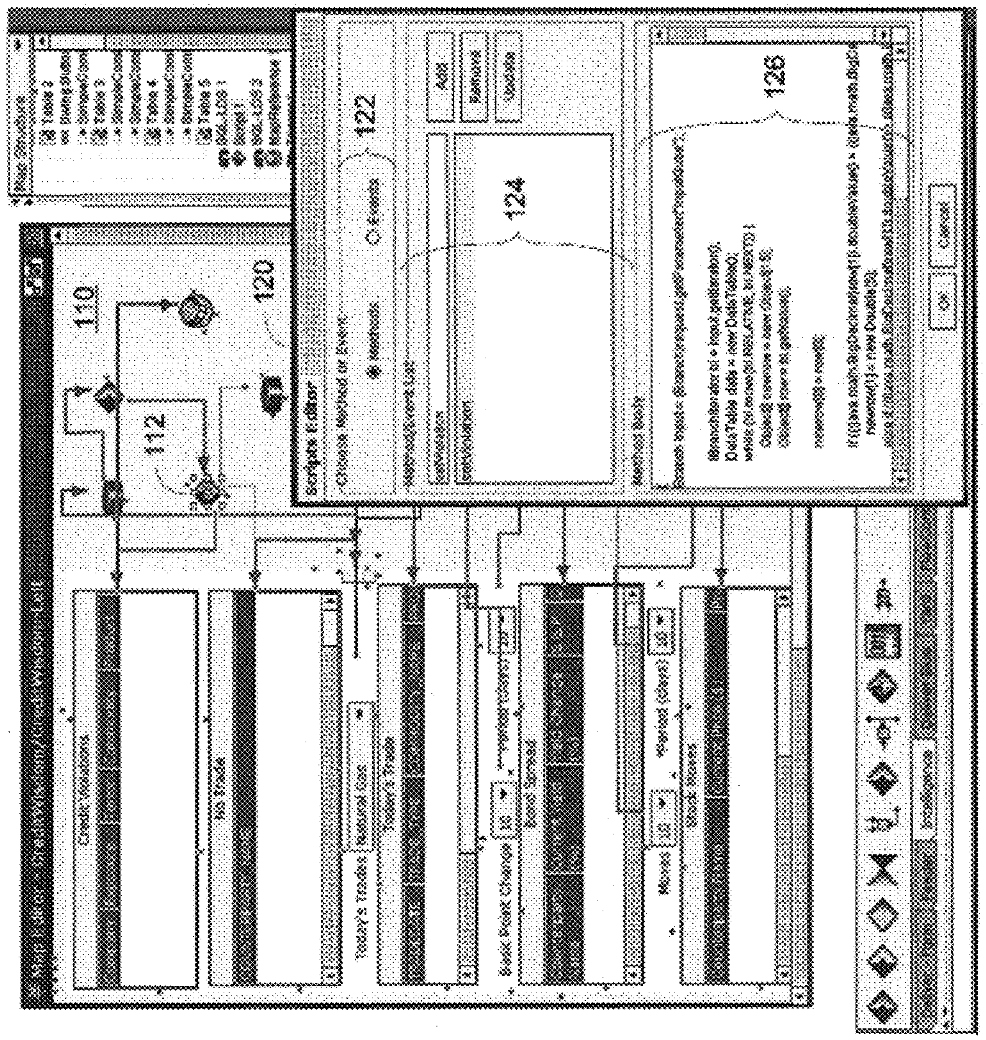
FIG. 1 depicts a version of the assignee's software, before power user-layer tools were developed.

FIG. 1 depicts a version of the assignee's software, before power user-layer tools were developed. This figure includes a map editor 110 with relative primitive capabilities and a script editor 120 that required builder skills to use. In the map editor window, a Java script icon 112 appears, which corresponds to the active scripts editor window 120. The scripts editor includes three panes. One pane includes radio buttons for choosing to script a method or event 122. The middle pane is a list of methods and events 124. The lower pane is Java code 126.

Figure 2:
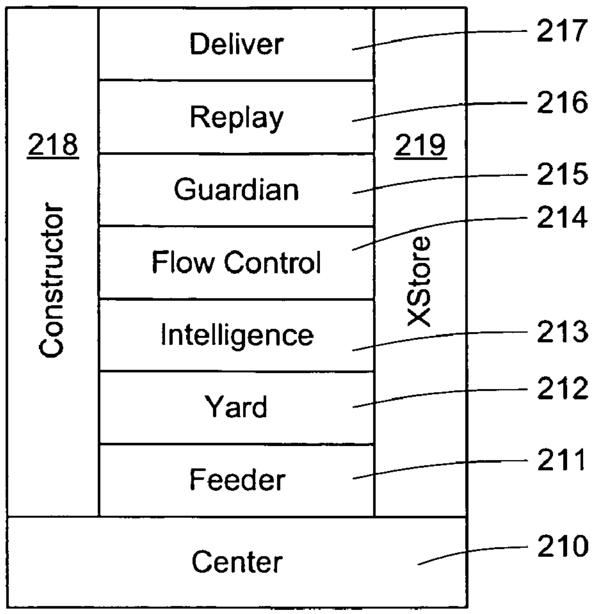
FIG. 2 depicts one arrangement of components.

FIG. 2 depicts one arrangement of components. The center 210 provides basic services for management and control in support of other applications. Data is fed into the system through the feeder 211, which handles physical data sources according to physical mappings and presents them as logical data sources. This data is staged in the yard 212, in so-called Qubes. Intelligent agents 213 operate on the data, applying rules. A flow controller 214 coordinates processes and workflow related to the data, applying maps. A guardian component 215 provides security. A replay facility 216 allows reconstruction of events and data flows. Data is delivered 217 to a canvas for review and interpretation. Across this arrangement of components, a constructor 218 implements a layered user interface and an XStore 219 provides integrated access to the metadata that defines these objects. Additional figures depict subcomponents of these components.

Figure 3:
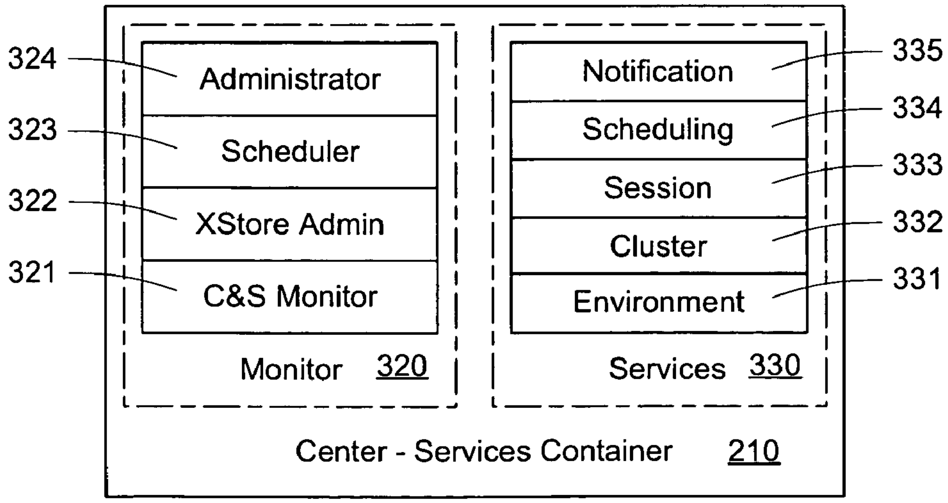
FIG. 3 is a block diagram of the center.

FIG. 3 is a block diagram of the center 210. The center provides services for the management and control required by enterprise applications. It serves as an adapter to the environment. The services 330 that it provides can be described as collections of methods, events and properties. For example, file services may provide ways to access files on disk, listen for the arrival of new files on disk and set default file directories, for instance, for text files. The center provides a services container where it manages services belonging to other components. It puts its own services in this container for other components to use and provides a service that allows other components to put their public services in this container. When one center talks to another, they can communicate by accessing each other's service container. In one embodiment, the center implements its service container as a JMX (Java management extension) mbean container within a J2EE environment. The services 330 depicted in FIG. 3 include an internal protocol for a logical message bus and protocol used for communication among components and with outside applications. A message bus and protocol are well adapted to location independence. Messages may be communicated in either binary or XML format. The XML format, or another industry-standard format, facilitates communication with outside applications. Environment services 331 expose information about the environment in which the software is running. The environment services also monitors the health of the system and the cluster of hardware on which the system runs. Environment services may track the memory usage of a Java virtual machine (JVM) and memory usage of the entire system. It may track performance information about the host computer, including CPU activity, process load, network activity, disk activity, etc. this performance information may be used to scale a cluster, a disk subsystem or other computer components. File services may provide controlled, secure access files on server and client computers. Cluster services 332 facilitate communication among servers running centers. Each center advertises its existence and services to the cluster to which it belongs. Centers in the cluster share resources were appropriate. Clustering enables the monitoring of numerous and disparate computers, recording activity and services throughout a cluster to one or more consoles. The consoles may manage and/or manage the cluster. Session services 333 implement a failover strategy for mission-critical deployments. Session services maintain session state information at predefined checkpoints or upon request, so the session can be restored in case of machine failure. Session services may be implemented using facilities of the environment such as J2EE application servers. In addition to services 330, the center 210 includes monitor components 320. Monitor is an administrative user interface that provides a view of the running environment and controls to manage services. With appropriate privileges, monitor components can be applied to the center where they reside or to a remote center in the same cluster. With other privileges, such as application administrator privileges, the monitor will correlate, aggregate and summarize information across centers in a cluster.

Figure 4:
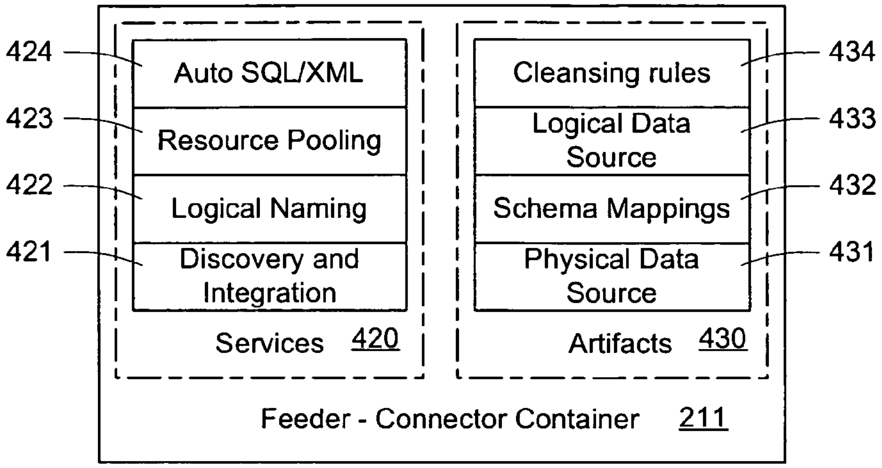
FIG. 4 is a block diagram of the feeder.

FIG. 4 is a block diagram of the feeder 211. It connects the analysis software to the business infrastructure. It provides physical connectivity to bring data into the center and provides data translation so that, regardless of data source and format, data can be presented uniformly as a logical data source. Optionally, the feeder also may discover data sources across the enterprise. A connector container 211 manages connectors currently in use by an application. It initializes the connectors when necessary and provides connection pooling and maintenance features. Connectors provide channels to the outside world. A connector represents a specific channel to a specific outside source. It maps the external interface into the logical framework of feeder. Connectors allow users to talk, listen and administer through a channel. The connector framework may include adapters, physical data sources and logical data sources. An adapter provides physical access to the external data. A physical data source interacts with the native protocol application program interface (API), implementing protocol specific requirements. In implements connect and secure services. A logical data source provides high-level access to APIs and subscriptions available from various physical data sources. It converts protocol-specific data into Qube format. Examples of connectors for major industry protocols and physical data sources include SQL, JDBC, ODBC, JCA; Java objects, JCA, JMS, JMX, JXTA, EJB; Web services, http/s client/server, XML, XSD, DTD, XSLT; Microsoft Excel, Outlook, Exchange Server, and Access.

Several services 420 are available on feeder 211. Discovery and integration services 421 identify potential sources of data on the network and across the enterprise. These services map the data. The user of discovery and integration tools applies these tools to configure the analysis software to a specific environment. With these tools, a user can create new Qubes or link existing Qubes to data sources that are identified or discovered. Logical naming services 422 identify connectors by logical name and allow other components to find and open the connectors. Resource pooling services 423 include connection pooling and ear pooling that support request/response and publish/subscribe protocols. In this context, "ear" refers to an Enterprise Java archive file with an "ear" extension. Automatic SQL and XML generation services 424 generate Qubes based on mapping. Utilities are adapted to generate mappings from database system catalogs and from XML schemas, such as XSD and DTD schemas. Custom SQL utilities can be provided, adapted to specific database vendors, as needed. In addition to the services depicted, security services can be provided to pass credentials through to protocol adapters and connectors. Feeder administration components enable monitoring and management of feeder activities in real time.

Figure 5:
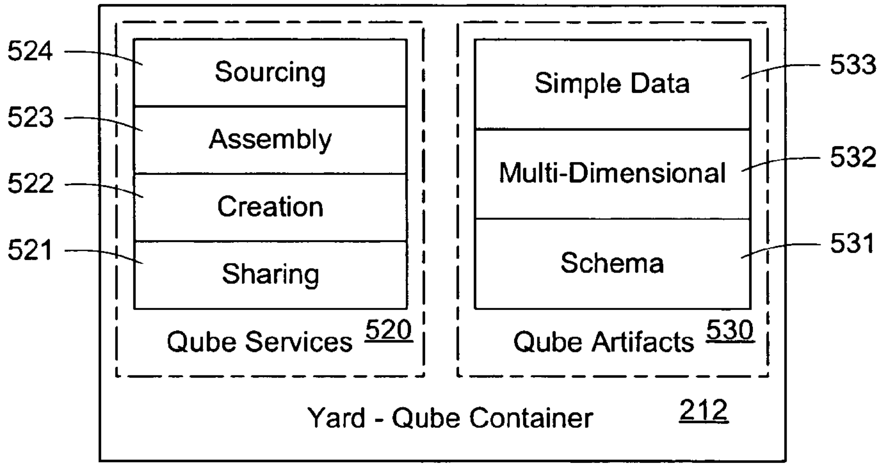
FIG. 5 is block diagram of the yard.

FIG. 5 is block diagram of the yard 212. The yard provides a logical view of enterprise data regardless of where it is housed or the physical format in which it is stored. The yard is one embodiment of a logical abstraction layer that allows builders think in terms of the business use of data, freed from the details of accessing the data. This virtual data is represented as an interrelated collection of so-called Qubes. A Qube is an abstraction that represents an enterprise business object. A Qube can be as complex as the business data object. A collection of Qubes can be as broad as the available data in an enterprise. Qube schemas describe what the objects look like and support search capabilities. Qube data captures the actual instances of business objects in memory, which users can add to, delete from and modify. The yard gets data from the feeder and passes modified data back to the feeder, which is responsible for synchronizing updates with the business data source. The yard provides schemas tools with which to define Qubes and link them to their actual data sources. The yard also provides a runtime container in which to hold Qube schemas and Qube data.

Qubes are a common data structure that can represent business entities, such as trades, policies or customers. Qubes are both hierarchical structures that support full inheritance and containment, and star like structures that support multiple hierarchical dimensions. Inheritance and containment enable a user to rapidly create new entities, as their business changes. Hierarchical dimensions support drill-down and roll-up. Several artifacts 530 or software components implement Qubes. The Qube schema 531 contains information about the structure of the associated business object and the business rules that apply to instances of the object. Schemas are linked back to a logical data source in the feeder that manufactures instances of Qubes. Multidimensional Qubes and dimensions 532 can apply to any branch of a hierarchical Qube. Multidimensional schemas and dimensions that they referred to provide the structural definition necessary for rotation and transformation of data at runtime. A software module known as Kaleidoscope supports rotation and transformation of data. Qube schemas and multi-dimensional schemas are stored in XStore. The Qube data 533 are instances of business objects. These complex objects can be traversed and transformed by end-users and software system components, using the metadata available in the Qube schemas. Qube data can be stored in XStore were mapped to XML and XSD documents. The yard 212 supports storage, retrieval, importation, exportation and translation of Qubes.

The yard provides a Qube container 212 that manages Qubes currently in use. Services 520 provided include, Qube schema sharing 521, providing quick access and memory optimization for schemas. Execution services provide Qube store and access services for both local and remote clients, allowing sharing of Qubes among centers, where appropriate. Qube data caching 521 supports public and private data caching and sharing for mostly read-only data, where in-memory caching is efficient. Schema creation 522 helps users retrieve data from external sources and XStore 219. Qube assembly services 523 help users to find and construct Qube from other Qubes, even those in memory or one's available from XStore 219, or available from some external location. Qube sourcing 524 maintains the mapping of a Qube schema to its providing connector. Qube sourcing also provides utilities to remap the Qube to a new physical source. Overarching the yard, yard administration provides monitoring administration that enables the user to monitor and manage all yard activities in real time.

Figure 6:
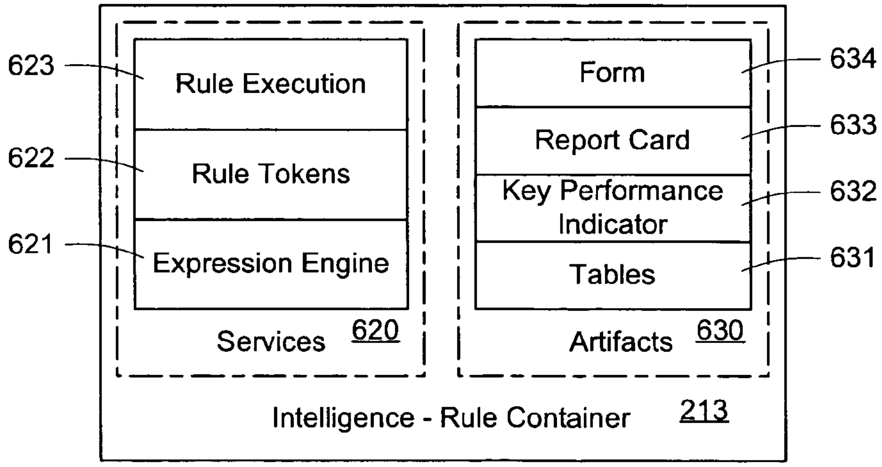
FIG. 6 is a block diagram of the intelligence module.

FIG. 6 is a block diagram of the intelligence module 213, which provides a rule container. This rule provides a declarative, business-rule language that enables the user to build a library of reusable rules applicable to specific business in area. The user may attach rules at specific event points. The intelligence module provides the on-line execution environment for immediate execution of rules in their business context. A user can see the results of applying filters, calculations and tests to their data, without an extensive compilation process. Rules may be reused or version and portability maintained. In the context of rules engine, an expression specifies a data transformation or calculation on one or more business objects. A rule is one or more expressions, with the name, description and other metadata, that applies in a given business context. A form is a collection of rules that all apply in the same context, to the same business object. A form includes rules triggered by standard events, such as changed data or added to data instances. A form also may trigger rules based on user-define events.

A rule container 213 manages rules currently in use. Various services 620 are provided. An expression engine 621 evaluates rules at runtime. The language supported by the expression engine is similar in richness to an SQL engine, an XQuery engine, an OLAP engine, or a spreadsheet such as Excel. When a rule executes, it accesses Qubes in its expression context. Qubes can come from any part of the system, provided that they are in the expression context. Application builders or other users of the system apply rule firing points to indicate when a rule should be applied. Firing of rules may be coordinated through a form 634, for instance a user interface form. Rule tokens 622 are specialized tokens that may be stored at a map. These tokens may refer to predefined a rule in the XStore or may themselves contain a filter, mapping, validation, scorecard or other rule. Rule execution services 623 provided caching, preprocessing, parallel processing, event callbacks and remote execution. Administration capabilities, described before, apply to the yard 212, as well as to other components of the system.

Various rule types are supported. Simple rules, like simple spreadsheet expressions, are supported. Some of the more complex rule types include statistical analysis, pivoting, automatic Qube transformation and summarization. Any Qube can be aggregated, sampled, grouped or analyzed in chunks. Statistical functions can be applied to groups and derivation rules replied to results of statistical functions, supporting trend analysis. Pivoting is a transformation rule that defines how users can slice and dice multi-dimensional data by rotating dimensions. For example, this rule allows users to aggregate a profile by sector, within geography, or within fiscal quarters. Automatic transformation of Qubes helps users restructure a Qube, to get a different perspective on the same data. This is particularly useful when the Qube contains complex data trees that might be viewed in different ways. Summarization is carried out by a so-called activity register engine that accumulates activities and summarizes the values of those activities in user-defined time buckets according to a set of user-define rules. The artifacts 630 of the intelligence component and rule container 213 include tables 631. A tabular expression is a fundamental part of rule that describes how to manipulate a Qube and provides context information. The context information may describe where the tabular expression can be used and for what purpose. A key performance indicator 632 is a tabular expression in the context of business problem, which includes user-define filters and calculations. A report card 633, which will be discussed much more extensively below, may include key performance indicators, associated with descriptions for categorization, lookups, easy reuse, etc. Report cards provide the business level semantic for many rule types, such as validation, filters, scorecards etc. Report cards let you define rules that inherent from other rules or are chained to other rules. Report cards provide context for storing and retrieving named rules. End users can run or schedule report cards and can define e-mail targets for report card results and custom formats for reporting. Policies are complex rule groups used for specific business applications, such as service-level agreement policies, customer performance satisfaction policies, and trend analysis and detection policies. Policies have their own user interfaces, but are implemented using core rules and expressions. The system also may interface with external policy engines to implement policies.

Figure 7:
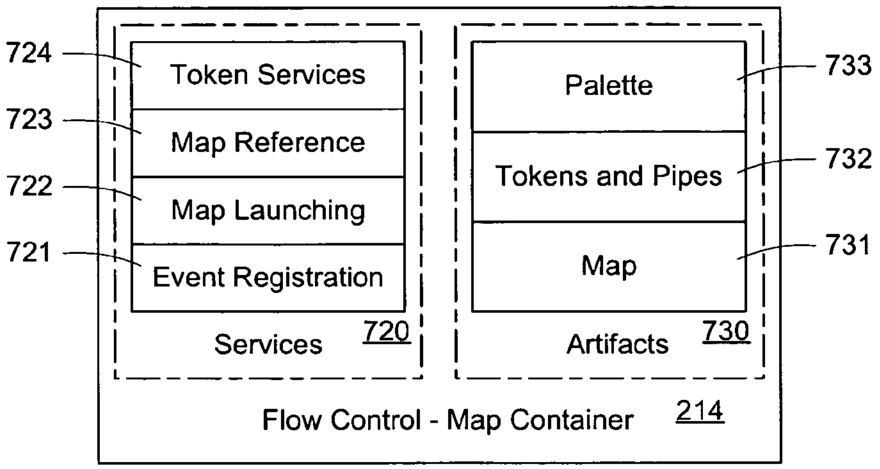
FIG. 7 is a block diagram of a flow control component and map container.

FIG. 7 is a block diagram of a flow control component and map container 214. It includes services 720 and artifacts 730. Business data analysis may involve a workflow, especially when institutional rules are applied on a repeated basis, for instance to applications or portfolio analysis. Analysis tools may be used to construct a report card that responds to a credit application or that responds to a market fluctuation by reanalyzing a portfolio segment. The starting point of a business analysis workflow is data assembly and marshalling through an analysis. An environment that allows power users and assemblers (as opposed to builders) to develop, revise and customize analysis tool that are fed by the business analysis workflow is believed to be unique.

The flow control component 214 includes tokens, pipes 732 and maps 731. A token represents a business element, such as a rule, data source, display element, e-mail alert or timer that is connected to other business elements. A pipe describes an information flow between tokens on a specific event, linking the event triggered by one token with the service provided by another token. A map is a combination of tokens and pipes that describe the flow control for a specific business process. The flow control engine allows the user to build maps or define workflows and then to execute the maps. The map and included tokens and pipes serve both as instructions for the flow, during design time, and conduits for actual information flow, when executed. The map is analogous to an executable program. It describes a workflow in one launch, executes that workflow. Maps are used in three modes. In design mode, maps are built by adding tokens and pipes. In test mode, the map is executed, while still displaying its plumbing. In live mode, the map is executed as a process flow, without debugging aides. The environment provided in one embodiment of the present invention supports design, test and live modes and controls user access to those modes based on privileges. A user with the correct privileges can revise an existing map by invoking the design mode and then debug it in test mode.

Tokens are proxies both for elements of the user interface and elements of the flow that are not normally visible when the interface is viewed. Tokens represent business constructs such as an SQL database, a graph or button on a screen, a rule, or an e-mail alert. Tokens have visual representations in the design mode. Some tokens represent objects that a user would not ordinarily see when viewing a display. In design mode, they too have visual representations. Some features of tokens include events, services and properties. Tokens emit or publish events. This allows map builders to draw a pipe starting with the token and the event published by the token. Publication of the event signals that another action should take place. Events can be triggered by a user action, a timer or an externally triggered the event, such as a message arriving on a message bus. Services are requested via a pipe. Many services accept parameters. For example, an Excel token that provides a get data service may require the name of an Excel range as a parameter. Properties of a token control its behavior. Most properties can be set either at design time or at run-time.

Pipes connect tokens. A pipe describes the flow of information triggered by an event at one token and fed into a service of another token. Qubes flow over a pipe as event arguments. Features of a pipe may include event pipes, argument pipes, result pipes and parallel piping.

The flow control component 214 provides a map container that manages the maps that are currently in use by an application. The map container provides services in design, test and live modes. Services 720 include map reference 723 and event registration 721, map launching 722, token services 724 and administration. Each map registers its existence and exports events that it can publish. This allows one map to reference another map, whether the reference is local or to a remote center. The map container maintains a dependency list, which is used to determine when an event occurring on a map results in a call to an object or invocation of a pipe. Map launching services invoke maps in a variety of ways. End-users can launch a map from a menu. Components of a software system can programmatically launch maps by invoking the map launcher class. This capability has been leveraged in development of one embodiment of the software. A map can be scheduled for launch at a given frequency. One map can launch another as a result of some combination of events and actions. Maps can be launched at startup, either a user sign-on or startup of the server or other component. As with other components, the flow control component has built-in monitoring and administration capabilities for real-time management of flow control activities.

Artifacts 730 of the flow control component 214 include maps and map interfaces 731, tokens and pipes 732 and pallets 733. A map 731 may define if, how and when other maps can invoke it. A map interface may include a visual icon or representation, documentation, and a specification of public interfaces. Maps can publish multiple interfaces, with different roles or purposes and different authorization requirements. Tokens and pipes 732 are described above. Form tokens are responsible for coordinating the interaction between Qubes and their visual representation. Specialized form tokens include edit forms and search forms. Edit forms provide viewing or editing of Qube data. Search forms respond to dynamic search criteria.

Figure 8:
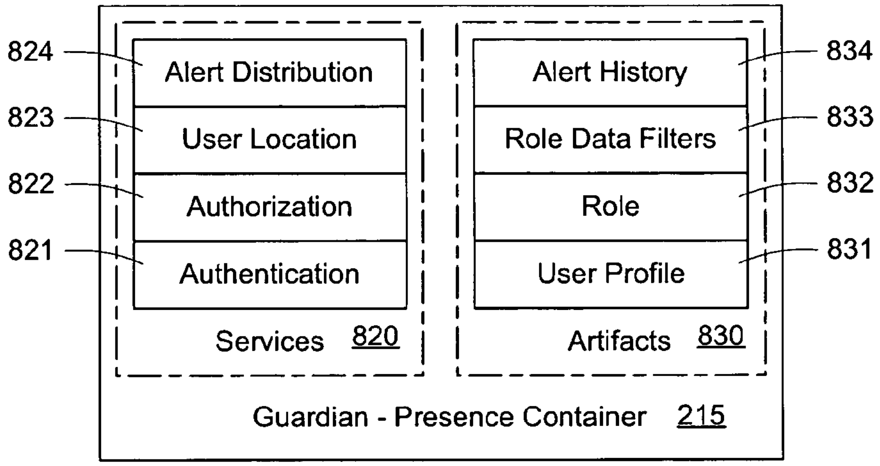
FIG. 8 is a block diagram of a guardian component, which includes a presence container.

FIG. 8 is a block diagram of a guardian component, which includes a presence container 215. The guardian component provides services 820 and includes artifacts 830. The guardian component is a gatekeeper that implements authentication, authorization and access control. It uses profiles, roles, menus and presence. It directs users to servers, authenticates them and limits their access to areas for which they are authorized. The guardian component tracks current users of the system and can notify users of important events, either in real time or through standard notification channels. A presence represents a known user of the system who is currently is signed on. It references a user profile, the role in which the user is currently functioning and current session information. Live and shadow preference types are recognized. A live presence is a user who is currently is signed on to the local center. A shadow preference is a user on a different center who is using services on the local center.

A presence container 215 manages the users and roles currently in use in an application. It provides services of authentication 821, authorization 822, user location 823, and alert distribution 824. Administrative services also are provided. Authentication services validate all attempted sign-ons, whether coming from an end-user, another center or another application. Authorization may support proprietary credential formats, security models such as LDAP or active directory, and single sign-on. In one embodiment, authentication is based on Java Authentication and Authorization Service (JAAS). Authentication services enable organizations to define security credentials in a common place and to have business analysis applications share the same credentials. Authorization 822 provides role-based services that limit access to parts of the application suite. Low level data filtering implements role-based data security. Authorization components can be configured to pass a presence's credentials to external systems, such as databases that are being queried for information. User location services 823 allow the system to locate a user. User location and alert distribution 824 access presences, and stored profiles and roles. Alert distribution may include real-time notification to on line end-users, and e-mail notifications based on profiles or roles. Dynamic registration is supported for subscription to monitor data. Features such as review, resend, archive, etc. are built into alert services. As with other components, the guardian component includes administrative functions.

Artifacts 830 included in the guardian component may include a user profile 831, roles 832, role data filters 833 and an alert history 834. These artifacts may be maintained in the XStore 219. A user profile object 831 contains information about a user, their preferences and other details useful in customizing the experience of end-users. A role object 832 contains information about access rights. Role data filters 833 limit the kind of data that can be seen, based on a selected role. These roles filters are applied at a very low level, to control data security and to customize the end-user's experience. An alert history 834 tracks alerts.

Figure 9:
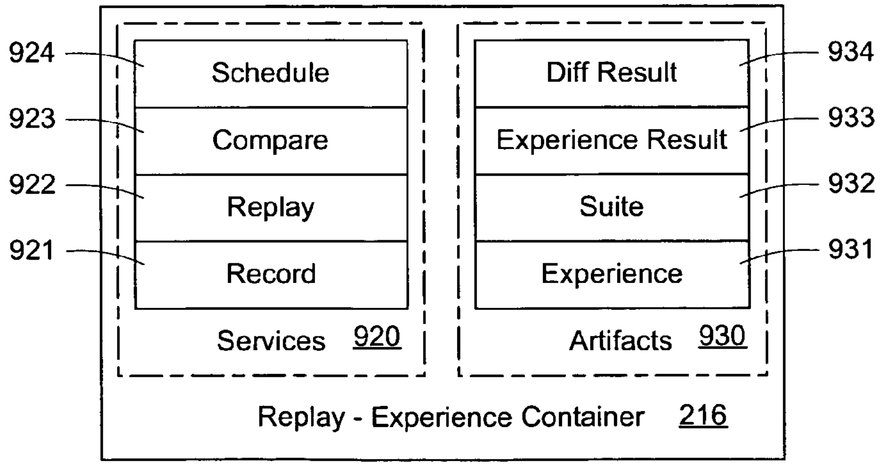
FIG. 9 is a block diagram of the replay component, which includes an experience container.

FIG. 9 is a block diagram of the replay component, which includes an experience container 216. The replay component includes services 920 and artifacts 930. The replay component records and replays user experiences. Users can start recording their experience or user case, and save it to the XStore. Later, they can play back what they did earlier. A replay can be scheduled on a fixed frequency or invoked on demand. The replay facility is useful for auditing, for nightly jobs, or for application testing. An experience is a specific use of the system that can be captured for later review, analysis or replay. Replay records the experience in the syntax that describes and-user actions. It stores the output of each step for later comparison of the output of one experience with other experiences. The replay component includes an experience container 216. The experience container manages experiences currently being used in the application. Its capabilities include record, replay, compare, schedule and administration. Recording services 921 allow one to start, stop or pause a capture session. Playback services 922 allow one to replay one or more experiences, using specified time for replay, platform for execution and destination for output. Compare services 923 allow one to compare one run with another, using predefined or custom comparison rules. Scheduling services 924 handled the scheduling of the replay of any save experience. E-mail alerts can be generated any initiation or completion of playback and upon completion of comparisons between resulting experiences.

Artifacts 930 included in the replay component 216 include experience 931, suite 932, experience result and suite report 933, and diff result 934. An experience 931 is a recording of an end-user use of an application. An experience represents a specific use case of the application. Suite 932 is a collection of experiences that can be executed together in a suite. The experience report and suite report 933 are results of running an experience and a suite. The diff result 934 as a result of comparing one output of an experience or suite with another output, for instance, the most recent run.

Figure 10:
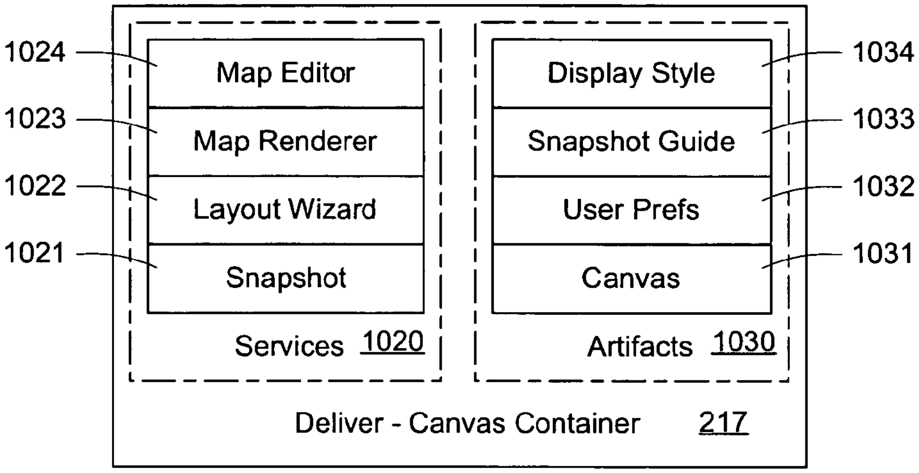
FIG. 10 is a block diagram of a deliver component, which includes a canvass container.

FIG. 10 is a block diagram of a deliver component, which includes a canvass container 217. The deliver component includes services 1020 and artifacts 1030. The deliver component is a user interface that presents personalized information end-users. The user interface may employ a variety of mediums, such as Java Swing, HTML, RTF, PDF or XML. The deliver component provides a customized user experience with familiar paradigms, including drag-drop, cut-paste, hot links, etc. A canvas is a description of visual elements that end users see as they use their business applications. A canvas contains a collection of containers and widgets, which are user-interface components that are combined to present the application to the end-user. Canvas and widgets have different representations, depending on whether the user-interface is implemented using HTML, Java, RTF, etc. Widgets include graphs, gauges, charts, split and hierarchical tables, etc. Kaleidoscope is a data-visualization widget that gives end-users the ability to interactively rotate data, to create tabular views, graphs and charts.

A canvas container is an end-user's main workspace. Canvases in the container may represent user interface windows. The deliver component 217 manages the canvas container, providing windows such as logon and role screens, menus and displays. The deliver component opens, displays and closes these windows. Services 1020 provided by the canvas container 217 include renderer 1023, layout wizard 1022, map editor 1024 and snapshot 1021. The canvas renderer 1023, is a rendering engine that renders a canvas in the targeted user-interface parameter. In one embodiment, it uses HTML to render web-delivered windows and Java Swing for desktop, graphic rich windows. Layout wizard 1022 determines the best layout for widgets on a canvas, given the business context. The layout wizard uses information in Qubes and rules in the business context to make a best guess for layout, widget types, default values, etc. It adapts display of information to delivery medium and screen resolution. The map editor 1024 is the design area in which users build and edit maps. The editor provides tools for defining application flow, laying out visual components, and access to business data objects, business logic and alert components. The editor tools allow a user to draw pipes that describe data flow and support switching from a design mode to a test or live mode, in which the map is running and producing results. Visual components of the editor include token property editors, a pipe editor and inspector and a map inspector. The snapshot service 1021 provides a view of a map's canvas at a particular time. Snapshot services can return a snapshot as an HTML, RTF, PDF or XML report, ready to be published. Snapshots can be saved in the canvas from which they are extracted and replayed at a later time. Users can customize the snapshot for each map, or they can use the default snapshot.

Artifacts 1030 for the deliver component 217 include canvas 1031, user preferences 1032, snapshot guide 1033 and display style 1034. Canvas 1031 is a specification of a user-interface display, described with a constraint-based layout so that the actual positioning can be refined at rendering time. User preferences 1032 may include window positioning, visibility, sort-order, custom rules and other artifacts that end-users can customize. Customized settings may be applied the next time that the end-user runs the application. Custom snapshot layouts 1033 include standard and customized snapshot renderers. Display style 1034 supports branding capabilities for look and feel customization. Custom color schemes, logos, graphics and similar features can be customized using the display style 1034.

Figure 11:
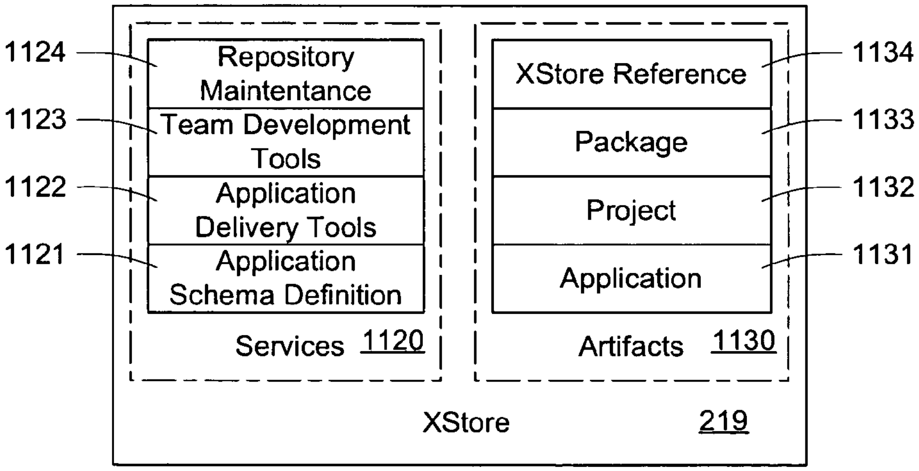
FIG. 11 is a block diagram of an XStore component.

FIG. 11 is a block diagram of an XStore component 219, which includes services 1120 and artifacts 1130. The XStore is a repository that stores and manages applications and data. It stores definitions of objects that make up an application. It provides a storage mechanism for the objects and utilities to maintain them, both individually and as a whole application. In various embodiments of XStore, some or all of the following advantages may be obtained: the XStore may let a user define application objects that are reusable, thereby increasing application developer productivity. The XStore may not require coding effort for creating or storing application objects. The XStore may represent application objects as XML, in relational database tables or in other formats. It may determine the appropriate format, based on the nature of an object and how it is accessed.

XStore services 1120 include application schema definition 1121, repository maintenance and browsing 1124, team development tools 1123, application delivery tools 1122 and general administrative tools as described for other components. The application schema definition service 1121 defines the schema for artifacts or data objects of an application. Repository maintenance and browsing services 1124 are tools and utilities to maintain a consistent repository of application objects and navigate the repository. Team development services 1123 support multi-user access to a repository and help with team development of software. Application delivery tools 1122 assist users in defining applications as collections of XStore objects, and installing and upgrading applications. Administrative services are provided for the XStore component, as described above for other components.

XStore artifacts 1130 include applications 1131, packages 1133, projects 1132, and XStore references 1134. An application artifact 1131 is a collection of XStore objects that make up a full application. A package 1133 is a named collection of XStore objects. A project 1132 is a collection of XStore objects that a user works on. An XStore reference 1134 is a dependency of one object maintained by XStore on another object, for instance a link between two objects. The reference 1134 can be useful when exporting an object, to assure that it is exported with appropriate context from other objects.

As FIG. 2 illustrates, the constructor 218 and XStore 219 are utilized across components 211-217. The constructor 218 is the visual, graphical environment in which one defines objects that make up an application. These objects include maps, connectors, Qubes, rules, canvases, etc. These objects are combined and go live when a user tests or runs and application. In various embodiments of constructor, some or all of the following advantages may be obtained: the constructor provides a powerful construction environment that lets one create definitions of objects and combine the objects to create a runtime application. Constructor may provide an easy-to-use graphical environment that enables users to quickly create applications. Applications created with constructor may be customized to specific needs, by modifying or adding components. At the builder layer or privilege level, a user has access to the full range of constructor tools. These tools include a map editor, which allows users to create and edit maps. A Qube editor gives a user the ability to define business objects and map them to physical data sources. A rule editor allows a user to define custom rules that are adapted to a particular business environment. A role and profile editor allows one to create new profiles and roles and to assign access privileges to maps based on the profiles and roles. The ability to define profiles and rules gives the user greater flexibility than just the define builder, assembler, power user, end-user and executive user roles.

For much of the discussion that follows, we divide users in the categories of builders, assemblers, power users, end-users and executive users. Builders are persons who regularly use code editors and understand how to access physical data sources, such as various varieties of databases. In this sense, code editors include SQL statement editors. Builders typically are comfortable seeing low level details of data sources, such as raw SQL statements and database access parameters, which would be quizzical or even intimidating to power users. Builders create and revise business data source objects that present an analyst-friendly interface, which consistently presents represents logical data sources and conceals many details of their physical data source characteristics and their disparate data management programs. Assemblers are users who spend much of their time developing business analysis tools, beginning with business data source objects that builders have created. Assemblers may create new business data source objects by transforming old objects that include physical data links, without having to set up any mappings to physical data sources. In some organizations, the roles of builder and assembler may overlap. Preferably, a user is allowed to choose the role of builder or assembler, or some other role, when logging on to a system. The selected role, in part, determines how the user experiences the system, what tools and views are presented or even accessible. A power user acts primarily in a business-oriented capacity, with a strong understanding of system tools for business analysis. A power user begins with business data source objects created by builders and/or assemblers. A power user does not have access to the tools used to link business data source objects to physical data sources. End-users and executive users are consumers of analytic applications, who do not modify the applications but may enrich them. The system does not give end-users or executive users access to tool modification. The system may allow end-users or executive users to drill down and see details of rules that are being applied by their analysis tools. Our principal differentiation between normal end-users and executive users is that end-users are likely to apply tools on a task-oriented basis, either responding to data and applying rules to make decisions or assembling data from which others will make decisions. Executive users rely on others to assemble data and often prefer graphical presentations of data supported by tables or other details that they can review after selecting areas of interest from the graphical presentations.

Figure 12:
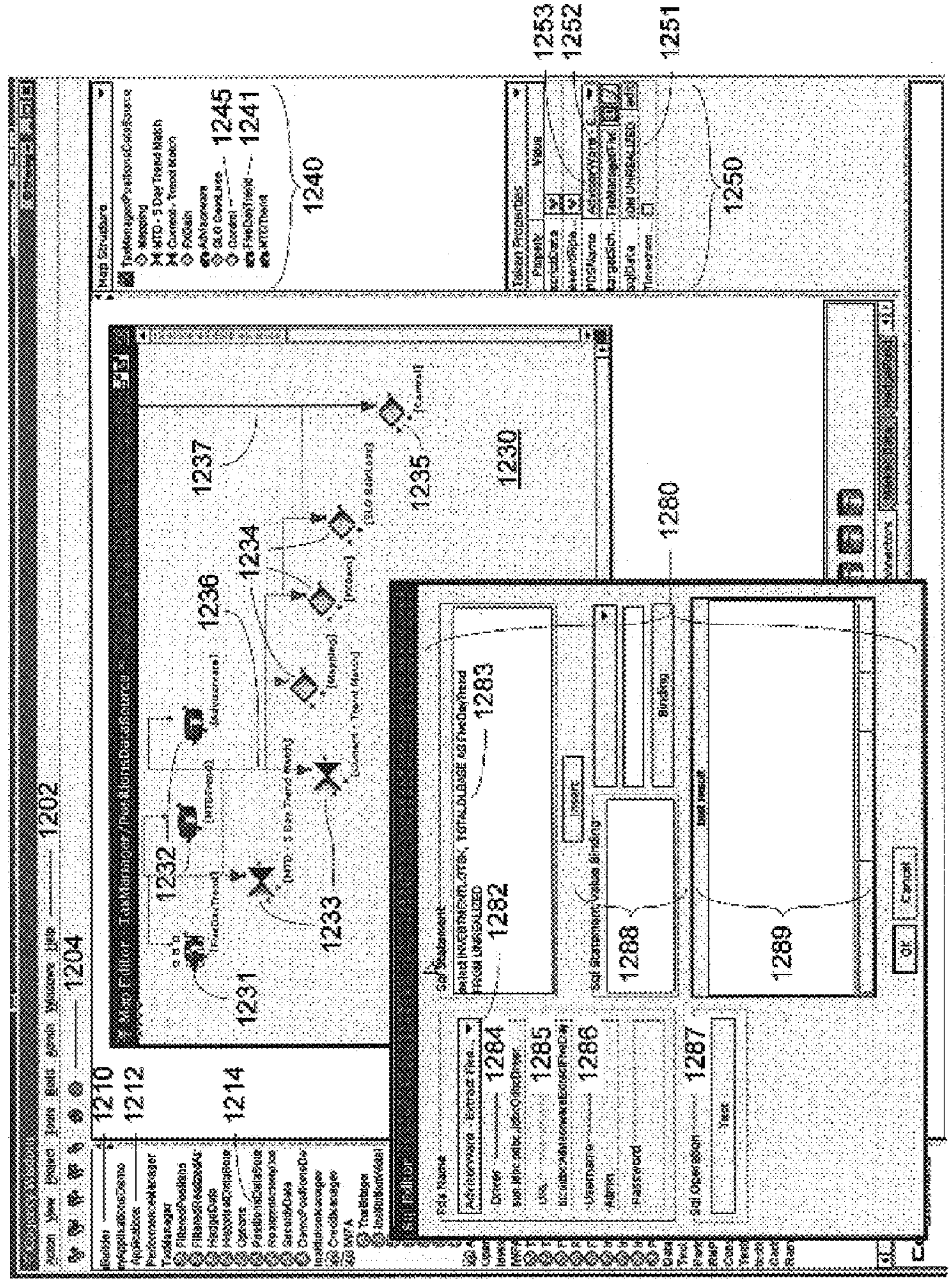
FIG. 12 depicts one embodiment of a builder-layer environment.

FIG. 12 depicts one embodiment of a builder-layer environment. Parts of the environment include a menu bar 1202, an icon bar 1204, a program objects hierarchy pane 1210, a map editor pane 1230, a map structure list pane 1240, a token inspector pane 1250 and an SQL editor window 1280. The menu bar 1202 acts in a familiar way, allowing a user to select from a variety of pull down menus that are displayed sensitive to the current context. The icon bar 1204 acts in a familiar way, allowing a user to select an icon that is directly connected to a program action. The program objects hierarchy pane 1210 lists applications and objects related to applications, such as data sources, filters, calculators and pipes. It can also include roles, profiles that are part of the application and many other objects too. Application modules 1212 are the top level of the hierarchy. In this example, performance manager, tax manager and institution manager are among the application moduless. Positions data source 1214 is one of the maps that combine in the tax manager application. Positions data source happens to be the map currently open in the map editor 1230. Among the icons visible in the map editor, five-day trend 1231 is the currently selected token, whose properties are displayed in a token inspector pane 1250. A list of the objects that appear in the map editor window 1230 is found in the map structure list pane 1240. The currently selected token, five-day trend 1230 appears as item 1241 in the map structure list pane 1240.

Returning to the map editor window 1230, the map shown includes three data sources, represented as business data encapsulation objects, which include physical mappings to physical data sources. The icons for the business data encapsulation objects 1231, 1232 represent a logical view of the data that is consistent, regardless of the disparate data sources underlying the business data encapsulation objects. The map 1230 also includes two data match rules 1233 that merge data from two or more sources, in this case, providing a month-to-date five-day trend and a current trend. Data from the business data encapsulation objects and/or the match functions is conveyed by the argument pipe 1236 to down-stream functions 1234, 1235. The downstream functions, Mapping, FXGain, SLO GainLoss and Control, transform selected data. The Mapping Function 1234 transforms merged data after the Current Trend Match to fit the format of a Qube being used by this application. Output available at the end of the event pipe 1237 comes from Control and reflects the results of upstream processes. In this case, Control 1235 is a process that modifies the data slightly so that it is presented in a desired format. An inspector may be provided to view the output available from Control 1235, at the end of the event pipe 1237.

The SQL editor window 1280 is a builder-layer tool that addresses details of the currently selected data source 1231.

In the SQL editor window 1280, details of the physical data source include name 1282, driver 1284, URL 1285, user name for accessing the physical data source 1286 and password associated with the user name. In this context, physical data source refers to an external data source with particular interface and driver requirements. "Physical" distinguishes data controlled by the system from data and external to the system. An SQL statement used to access the physical data source and retrieve the desired data 1283 appears in a separate pane of the window. Additional SQL statement tools 1288 appear as appropriate. Selecting a test button 1287, which produces test results in a window 1289, can test operation the SQL statement. Immediate access to the test button 1287 and results 1289 allows a user to confirm configuration of the business data encapsulation object and move on to creating other objects or using data with filters, calculators or the like.

Inspector-type access is provided at both the map and token levels and also may be provided for pipes. The map structure list pane 1240 can be sorted in various ways. It provides an alternative way of selecting a current token. The token properties pane 1250 provides details of the current token. Applied to the five-day trend 1231, token properties include a physical data source name 1253, which matches the name 1282 in the SQL editor window 1280. Properties further include a target schema 1252 and SQL data 1251, with an edit button that opens the SQL editor window. At the bottom of the figure, the connectors tab is highlighted. This tab brings up several choices of connectors to physical data sets. The rightmost pipe 1237, displayed on the screen in a contrasting color, is the flow control pipe. When the positions data source business data encapsulation object is accessed, outputs of Control 1234 are metaphorically carried out the event pipe 1237 and are accessible.

The filter criteria comes in with the event pipe; it is fed into the Control rule, which implements the filtering of the about-to-be-returned data using the input filter.

Figure 13:
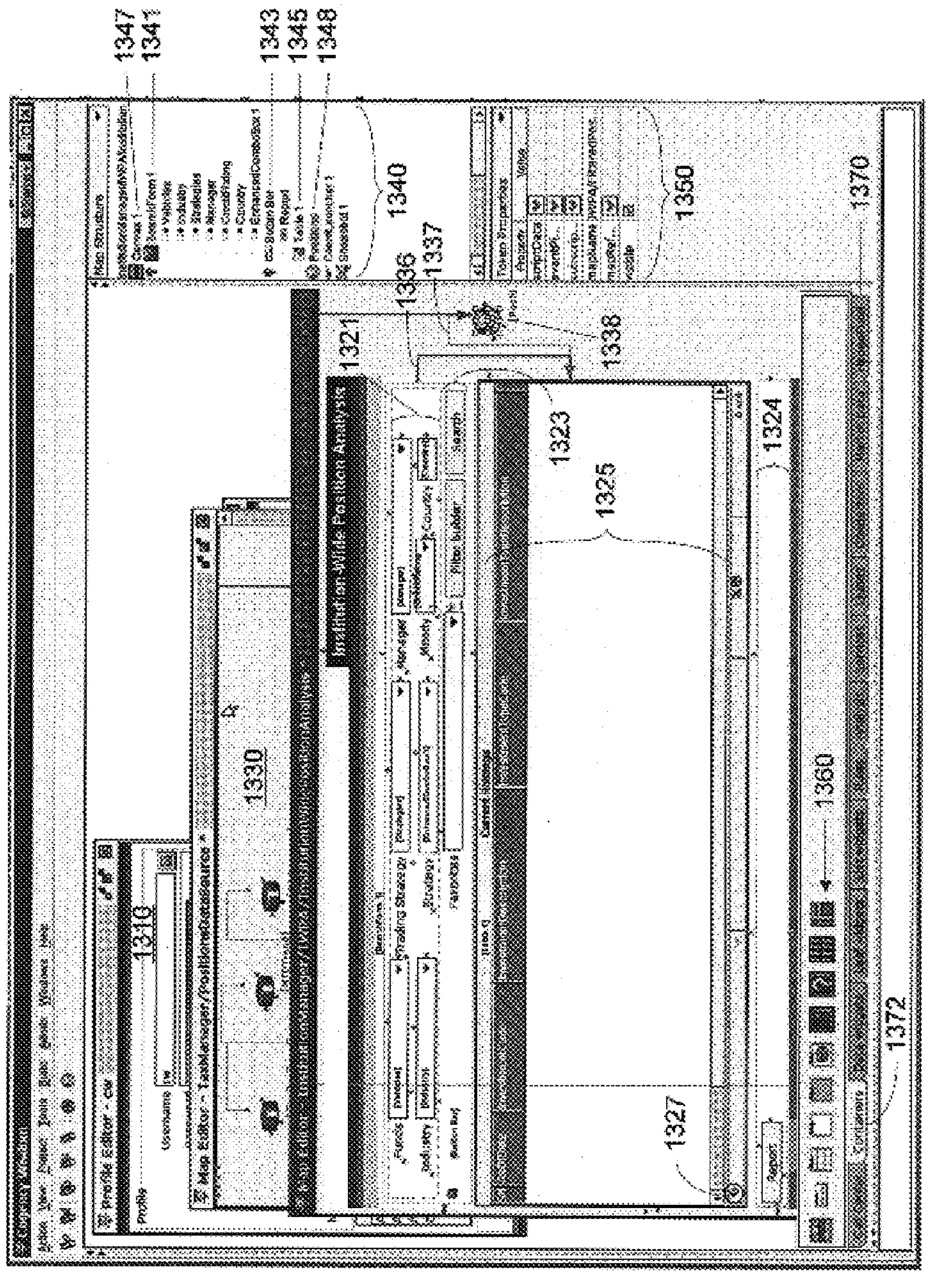
FIG. 13 presents another aspect of a builder-layer environment.

FIG. 13 presents another aspect of a builder-layer environment. Parts of this environment include a menu bar 1302, an icon bar 1304, a search and table output pane 1320, a map editor pane 1330, a map structure list pane 1340, a token inspector pane 1350, a data source palette 1360 and palette selection tabs 1370. The menu bar 1302 acts in a familiar way, allowing a user to select from a variety of pull down menus that are displayed sensitive to the current context. The icon bar 1304 acts in a familiar way, allowing a user to select an icon that is directly connected to a builder-layer environment action.

The windows cascaded in this figure include a profile editor 1310, the map editor for positions data source 1330 and the map editor for institution line position analysis. The profile editor 1310 is used to assign rights to user "cw", which enable access to the map editors and operation of the resulting applications. Details of the profile editor appear in the next figure. Among canvas tabs 1370 the selected tab is containers 1372. The map editor for positions data source 1330 produces the business data encapsulation object 1338, to which the search criteria 1321 are applied, as described in a previous figure. The positions data source 1338 graphically depicted in the map editor 1330 corresponds to output from the map editor window of FIG. 12, which has the same name. In the map editor 1330, one pipe 1336 connects the search section 1321 to the output table 1325. Another pipe 1337 connects the positions data source 1338 to the output table 1325. Interconnection of these pipes implies that the search formulated in the search section 1321 is applied as an argument to a filter function that selects data from positions data source 1338, upon pressing the search button 1323. In the search pane 1321, pull down pick lists have been supplied for trading strategy, manager, strategy, Moody credit rating and country. Direct entry, drag-and-drop, or other familiar methods for selecting filter criteria could be applied. Access to recorded favorites 1322 is provided. Next to the search button, a filter builder button appears for building or modifying search criteria used to generate a table. As in FIG. 12, inspector-type panes are provided at the map 1340 and token 1350 levels. A pipe inspector optionally may also be provided. This map structure list 1340 includes a canvass 1347, and a subordinate search form 1341, button bar 1343 and table 1345. The canvass may be connected to a client launcher and/or snapshot. The data source type for this report is the positions data source 1348. The table 1325 is populated with data from the positions data source 1338. The calculator icon 1327 invokes a calculator that operates on data from positions data source 1338. A power user may invoke this calculator without any need to access builder-layer tools. Among the pallet tabs 1370, the container's palette has been selected 1372. A variety of containers 1360 are available, among which a user can select, drag and drop, when in design mode. The type of containers accessible depends on the user's role.

Figure 14:
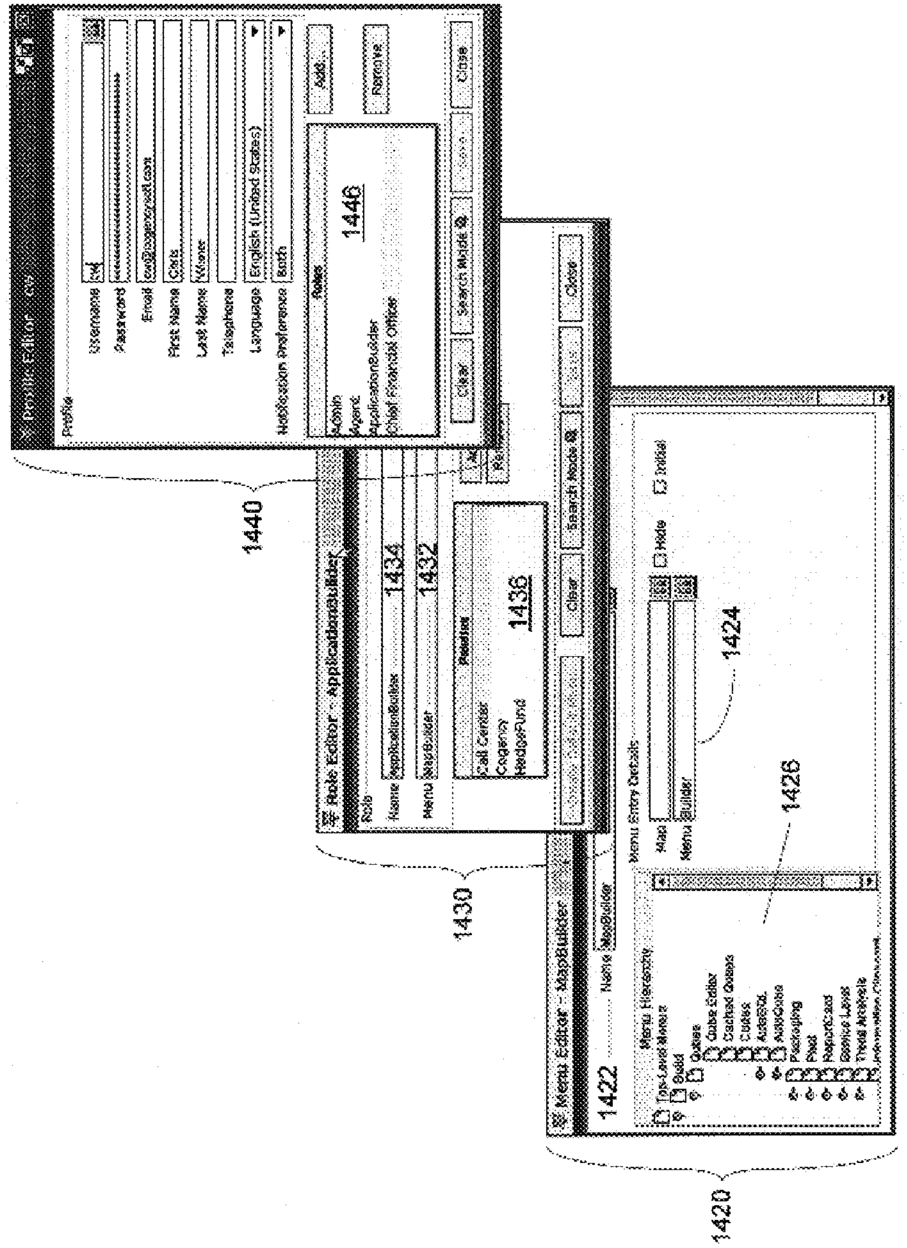
FIG. 14 illustrates the interrelationship between a menu, role and user profile.

FIG. 14 illustrates the interrelationship between a menu, role and user profile. A menu editor window 1420 includes a menu hierarchy 1426. In a familiar style, branches of the hierarchy can be expanded or collapse. When an entry is selected from the menu hierarchy, the name of the selected menu 1422 is confirmed in a name bar and reflected in the window title. Access to the menu hierarchy "map builder 1452" is organized by role using the wool editor 1430. Our role main is assigned 1434, such as builder, assemblers, power user, and user or executive user. The menu hierarchy or subsection to which access is provided is named 1452. Palettes (applications) in which the menu will be active 1436 are listed. In the profile editor 1440, a user is assigned one or more roles 1446, which they can invoke upon signing in. The role with the invoked determines whether or not they will have access to certain layers of the application, such as the map builder menu hierarchy.

Figure 15:
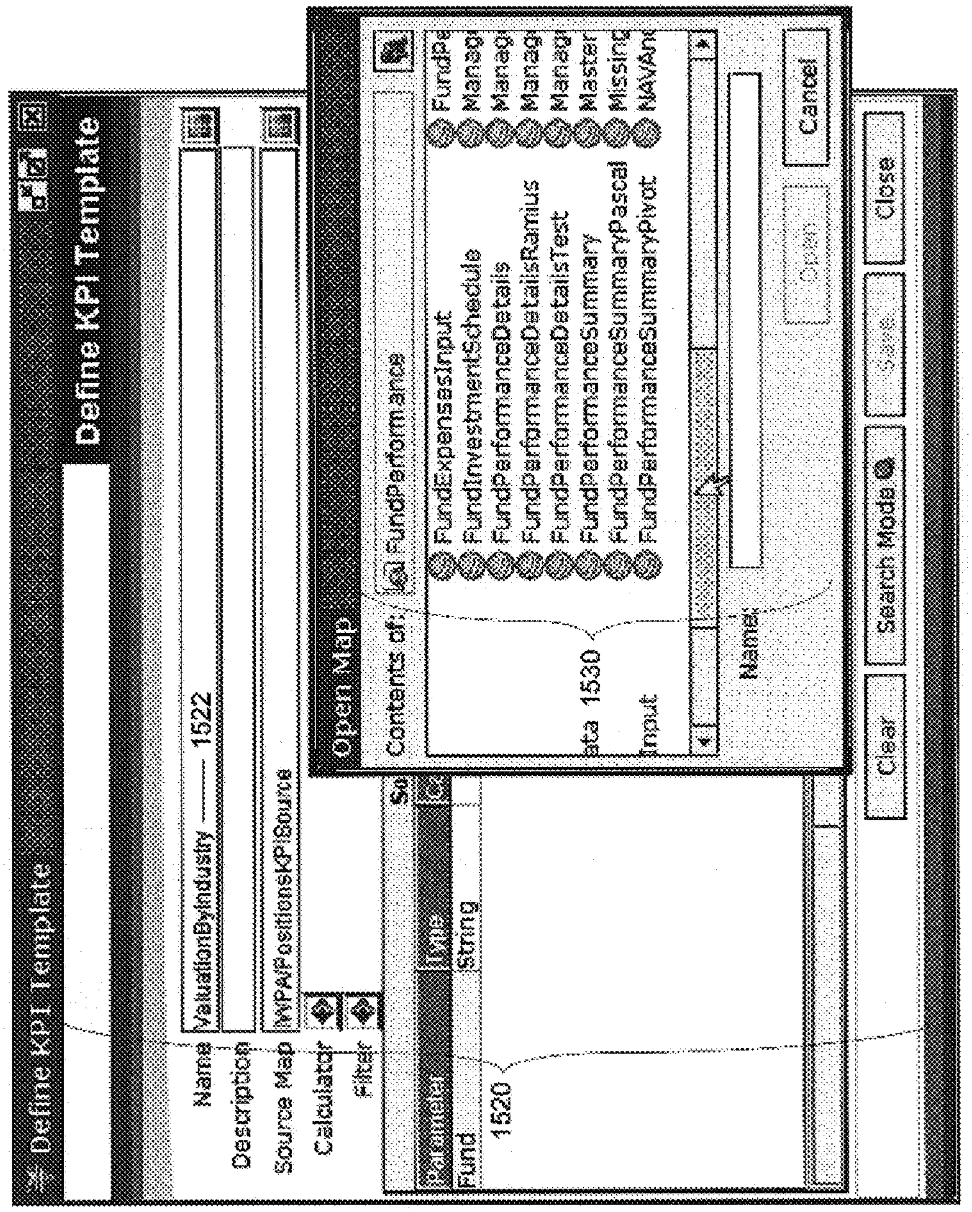
FIGS. 15-18 illustrate steps in defining a key performance indicator (KPI) template.

FIGS. 15-18 illustrate steps in defining a key performance indicator (KPI) template. In FIG. 15, the defined template window 1520 allows the user to name a template 1522 and provide an extended description corresponding to the name. The user completes the template by associating a source map, such as positions KPI source, with the template and by optionally applying a calculator and filter. A table is used to construct a parameter list that provides parameters to a downstream function. In FIG. 15, a source map is selected using an open map window 1530.

Figure 16:
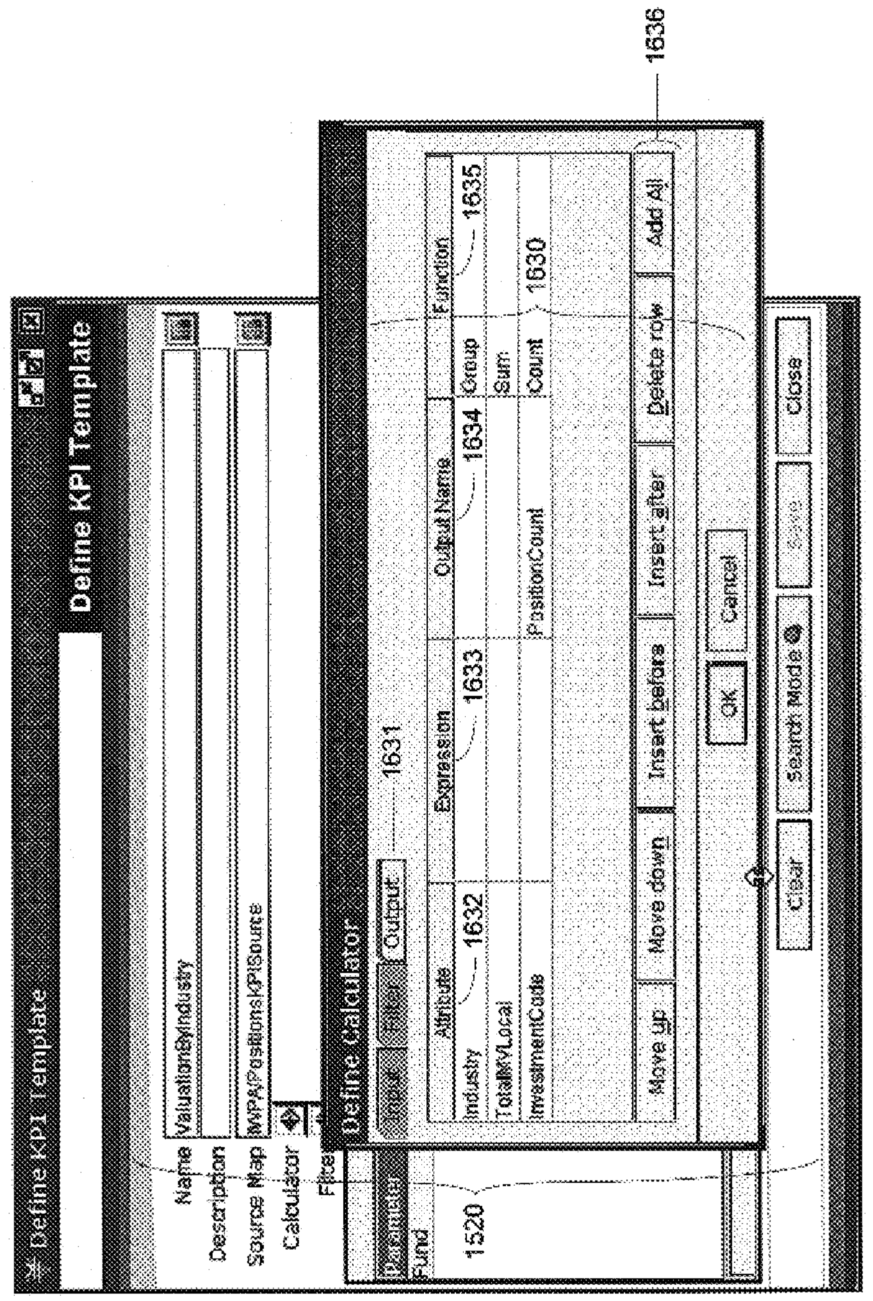

In FIG. 16, a define calculator window 1630 overlays the define template window 1520. The input tab of this define calculator window is associated with the source map selected in the define template window 1520. The filter tab 1631 invokes a filter prior to the calculator operation, similar to the filter in FIG. 17. In FIG. 16, the output tab 1631 has been selected. Calculations are described using a table with columns for attributes or fields 1632, expressions 1633, output names 1634 and functions 1635. In this example, data is grouped by industry, applying the group function 1635 to the industry attribute of records from the positions KPI source. Similarly, a field named position count is created as a count of items having a particular investment code. A number of buttons 1636 are supplied to manipulate rows of calculator declarations.

Figure 17:
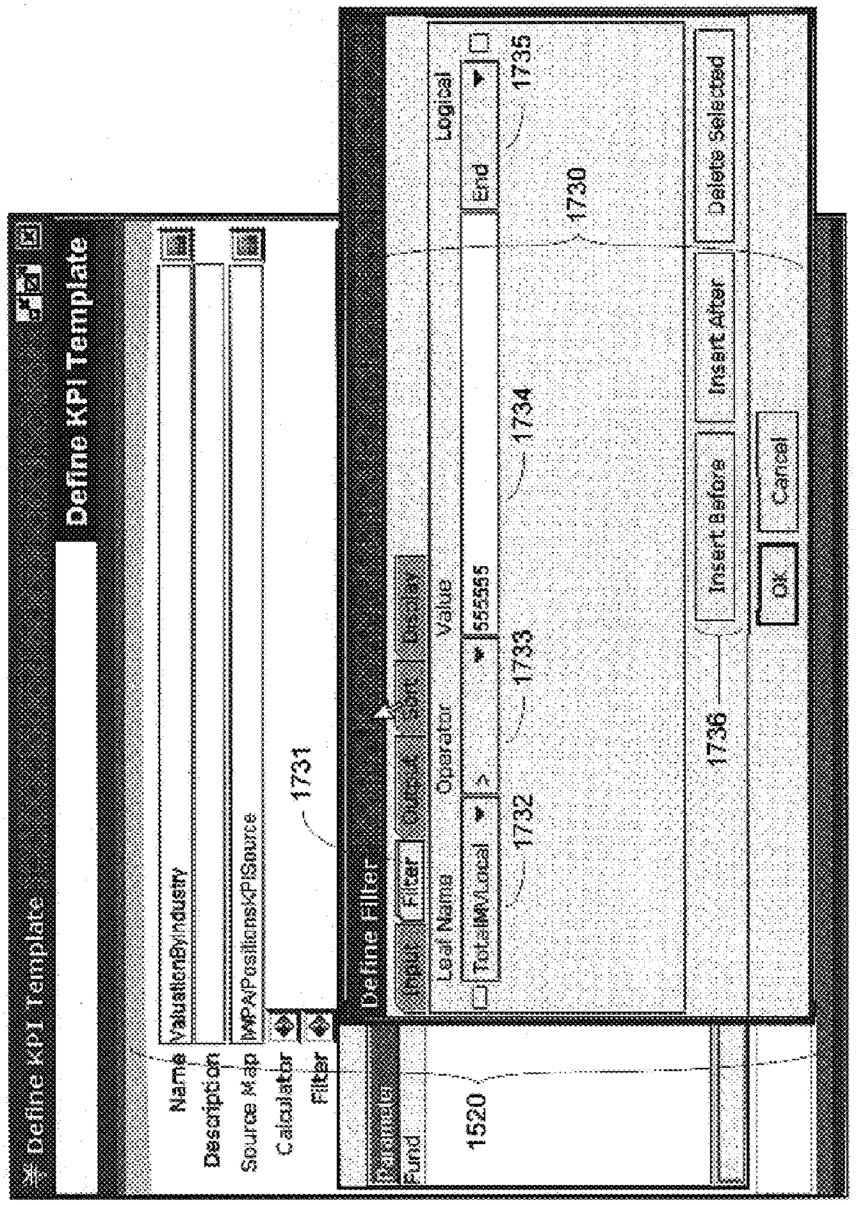

In FIG. 17, a define filter window 1730 overlays the define template window 1520. The filter icon invokes this window. The filter tab 1731 has been selected. The filter illustrated operates on the total MV local sum calculated as depicted in FIG. 16. The leaf name "total MV local" 1732 is operated on using an arithmatic or a logical operator 1733 (or any of the sorts of operator conventionally defined for spreadsheets). For binary operators, a value 1734 is filled in. Logic 1735 such as "and", "or" or "end" specifies how one filter row relates to the next. Buttons 1736 manipulate rows in the filter table.

Figure 18:
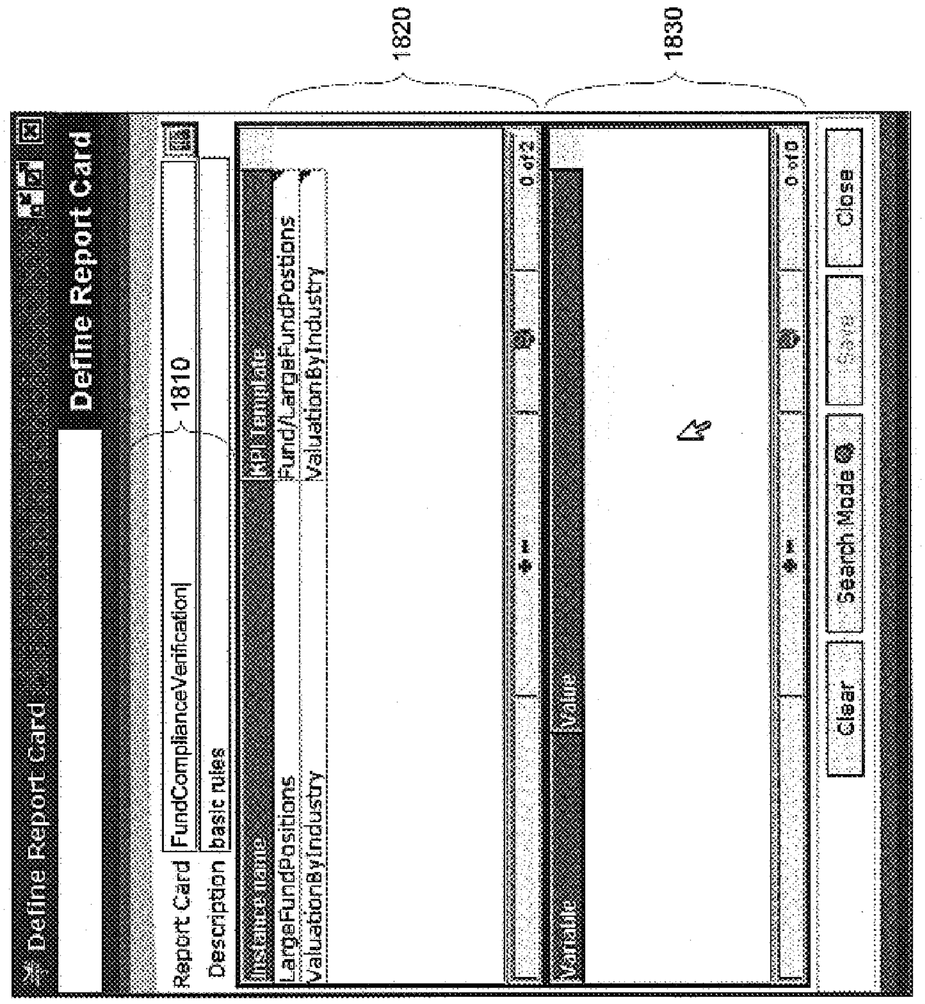

The define report card window in FIG. 18 links KPI template scheme to a report card format. A particular report card is named and described 1810. Instance names of rules are added to the report card 1820. Argument values for the KPI template may be supplied here by the users constructing the report card. Arguments whose values are not supplied here need to be provided later by the end-user before executing this report card.

A completed report card, entitled "Fund Compliance Verification" is illustrated by FIG. 19. Funds from which data can be selected appear at the top of pane 1910. Key indicators are summarized in report card format in the middle pane 1920. The valuation by industry key indicators 1924 is as defined in FIG. 17. Both KPI indicators 1922 and 1924 were added to the report card in FIG. 18. The calculator results defined in FIG. 16 appear in table 1923. A user with privileges can invoke the calculator view by selecting the icon 1926 or 1936 that are in the lower left corner of the key indicator and calculated value panes 1920 and 1930. A user with privileges also can drill down to view the rules behind the status indicators in the key indicator pane 1920 by selecting button 1941.

Another application of filters and calculators to business data encapsulation objects is illustrated by FIGS. 20-21. In FIG. 20, filter builder window 2030 allows the user to apply a custom filter to data from a preselected source 2040. This allows an end user to select a subset of data. The filter builder window 2030 may be invoked using a button on the button bar 2020. It includes current and saved filters 2039, filter name, owner and description 2038, filter logic 2032-2135, and filter row manipulation buttons 2036. In FIG. 20, the current filter tab has been selected 2039. The current filter is named "MS1 Fund with good rating". The filter owner, to which certain privileges are attached, is assigned when the filter is created. A description to supplement the filter name is optional. Rows of filter logic operate on leafs 2032. A unary or binary operator 2033 is applied to a leaf. For binary operators, a comparison value 2034 is applied. Logical operators 2035 connect groups of rows. Between two groups of rows, an additional logical operator is illustrated. One who studies FIG. 20 will realize that the second group of rows posit a test that returns records where 'S and P' rating is AA, AAA, AAAA etcetera.

FIG. 21 illustrates application of a table calculator to data selected by the filter. An icon button 1936, 2046 may invoke the table calculator. The table calculator window 2130 overlays the table output 2040 of the industry wide position analysis. This figure, the current calculator tab 2038 is selected. A reference name, "group by industry" is applied 2039. Using the output tab 2131, rows of been added that have columns including attributes 2132, expressions 2133, output names 2134, and functions 2135. These rows define calculations. In this example, the functions named group, sum and count are used. No expression is applied. Buttons 2136 are supplied for manipulating the calculator rows.

FIG. 22 illustrates a relatively elaborate report with report card and graph features for a call-center application. Parameters are entered in the top pane 2210. The parameters in this example determine the operation of the status buttons. The parameters set target values and thresholds to be applied to the target values. If fifty percent of calls for service were handled within the ideal target value time, the status button would have a favorable appearance. The middle pane 2220 includes two status buttons for each day of data. The lower pane 2230 graphs some of the data that appears in the middle pane. More data is shown in the graph than can be viewed in tabular format. Accordingly, the middle pane includes a slider bar for looking through rows of data.

SOME PARTICULAR EMBODIMENTS

The present invention may be practiced a method or device adapted to practice the method. In one embodiment, the method differentiates users based on their roles and presents tools suited to their roles, hiding from power users were end-users tools adapted to builders that would tend to confuse or confound them. The same method can be viewed from the perspective of a builder, a assemblers, a power user, an end-user, or software system. The invention may be an article of manufacture, such as media impressed with logic adapted to carry out a method differentiates users based on their roles and presents tools suited to their roles. Similarly, as an article of manufacture, the invention may be practices a data stream carrying logic adapted to carry out a method that differentiates users based on their roles and presents tools suited to their roles.

One embodiment includes an enhanced method of business analysis available at a power user-layer. This method may be practiced within a layered development and display environment that differentiates at least between builder, power user and application end-user roles. In this environment, access to layers of development tools and displays is controlled by role-oriented privileges. One aspect of this embodiment is using builder-layer tools to build or create one or more business data encapsulation objects that present available data using a consistent metaphor. This metaphor or style of presentation remains consistent, regardless of details of particular data sources. The consistent metaphor may take the form of the table with columns for data fields. It is considered useful to have a consistent metaphor or style of presentation across the SQL, JDBC, and ODBC-accessible databases, as these type of databases may be mixed in a typical application. It also is useful to have a consistent metaphor for Web service sources and XML objects, which are typically used by Web services. It is further useful to have a consistent metaphor for access to Java-type objects, including JCA, JMS, JMX, JXTA and EJB objects. Given Microsoft's market position, it also is useful to provide a consistent metaphor for access to Excel, Exchange Server and Access database sources. More preferably, it is useful to provide a consistent metaphor across at least two object kinds in at least two of the categories SQL/JDBC/ODBC-accessible databases, Web services/XML, Java-type objects and Microsoft data sources. Another aspect of this embodiment is assigning to a user power user-layer privileges. Invoking the power user-layer, by role, hides from the power user the builder-layer tools that address details of particular data sources. A power user need not be bothered by the name of the software driver used to access an SQL database. This embodiment further may include using power user-layer tools that present a declarative, non-coding interface. Builders learn coding. Power users prefer not to write program code. A declarative interface is preferred for power users. This declarative interface may be used one or more times to choose a data source type, construct a calculator applicable to that data source type and construct filter tests that apply to results of the calculator. The data source type applies to one or more of the business data encapsulation objects. Multiple business data encapsulation objects may share the same data source type and be subject to the same calculations. The calculator applies calculations to data that is compliant with the chosen source type. The filter tests apply to results from the calculator. From one or more filter tests, this embodiment includes creating a named collection of filter tests. The named collection of filter tests may be associated with a display of results from the filter tests. After creating a named collection of filter tests and, optionally, a display for the results the filter tests, an application end-user may become authorized to apply the named collection of filter tests. The application end-user may select data from one or more than business data encapsulation objects that are compliant with the data source type and apply the named collection of filter tests to the selected data.

An additional aspect of this embodiment is that the business data encapsulation objects may have business data-oriented names. Names that are business data-oriented are more comprehensible to power users than names that are data processing or programming-oriented. Another aspect, that may be combined with elements of the base embodiment or other aspects, includes invoking an immediate execution mode with the named collection of filter tests. This immediate execution mode accesses data presented by the business data encapsulation objects, without a separate compilation and linking step. As applied to filter tests and an optional display, this aspect further may include selecting data compliant with the data source type and viewing the display of results of the filter tests.

One optional feature of this embodiment is a graphical summary display of results of one or more filter tests. The graphical summary display may take on various appearances. For instance, a multi-colored indicator, color-coded to convey the result of particular filter tests may be used. Alternatively, a gauge with the pointer, the pointer indicating the result of a particular filter test may be used. Or, the graphical summary display may be a variable sized indicator, size-coded to convey the result of a particular filter test.

Another embodiment is an enhanced method of business analysis available at a power user-layer. This embodiment may be practiced within a layered development and display environment that differentiates at least between builder, assembler and end-user roles. In this environment, access to layers of development tools and displays is controlled by role-oriented privileges. One aspect of this embodiment is using builder-layer tools to build or create one or more business data encapsulation objects that present available data using a consistent metaphor. This metaphor or style of presentation remains consistent, regardless of details of particular data sources, as described in the prior embodiment. Features and aspects of this consistent metaphor that are described above apply to this embodiment as well. The method of this embodiment further may include using assembler-layer tools to assemble a screen that presents data from the business data encapsulation object, wherein the assembler-layer hides the builder-layer tools that address details of particular data sources. The assembler need not be bothered, for instance, by the name of the software driver used to access an SQL database. This embodiment further may include assigning to a user end user-layer privileges, wherein the end user-layer hides from the end user the builder-layer tools that address details of particular data sources. The end user may use a declarative, non-coding interface, one or more times to define a filter, build a table calculator that processes results from the filter, and apply the table calculator. The filter applies to data associated with the screen that was assembled using assemblers-layer tools.

An aspect of this embodiment is that the end user-layer hides from the end user the assembler-layer tools that present the data from the business data encapsulation objects. The end user may be limited to data selected by the assembler.

In this and other embodiments, the builder-layer tools and the assembler-layer tools may be accessible from a role that combines both builder- and assembler-layer access.

Another embodiment is a software development and execution environment. This environment may include logic and resources to define rules for users that differentiate at least between builder and power user roles. It also may include logic responsive to the defined roles that controls access to layers of development tools and displays. The development tools and displays include builder-layer tools to build one or more business data encapsulation objects that present available data using a consistent metaphor regardless of builder-layer details of particular data sources. They may include power user-layer tools that present a declarative, non-coding interface to construct of filter applicable to one or more business data encapsulation objects; a calculator applicable to output of the filter; and a filter test applicable to output of the calculator. All layers of tools may invoke an immediate execution mode that applies the filters and calculators to data presented by the business data encapsulation objects, without a separate compilation and linking step. Invoking the power user role may hide from the power user the builder-layer details of particular data sources. Other features and aspects of the methods described above may readily be combined with this software development environment.

The system further may include builder-layer tools that are adapted to define data source types applicable to sets of one or more business data encapsulation objects and power user-layer tools that construct the filter and the calculator, adapted to apply to data compliant with the data source types.

While the present invention is disclosed by reference to the preferred embodiments and examples detailed above, it is understood that these examples are intended in an illustrative rather than in a limiting sense. Computer-assisted processing is implicated in the described embodiments. It is contemplated that modifications and combinations will readily occur to those skilled in the art, which modifications and combinations will be within the spirit of the invention and the scope of the following claims.

We claim as follows:

1. An enhanced method of business analysis available within a layered development environment, the method including:

accessing layers of development tools running on a computer, wherein the access is controlled by role-oriented privileges that differentiate at least between builder, power user and end user roles;

using builder-layer tools in the builder role, creating one or more encapsulated business data objects that provide access to raw data, wherein the encapsulated business data objects are presented graphically to a power user without builder-layer details of the raw data sources, further using the builder-layer tools to assign data source types to the encapsulated business data objects;

using power user-layer tools in the power user role, repeating one or more times the following:

choosing the data source type that applies to one or more of the encapsulated business data objects;

applying at least one spreadsheet-style function to construct a calculator applicable to data from the data source type; and constructing a filter that tests results from the calculator and produces filtered test results;

wherein the power user-layer tools allow the power user to manipulate data in the encapsulated business data objects using a declarative, non-coding interface;

further using the power user-layer tools, creating a named collection that includes on or more of the filter tests and at least one display of the filtered test results; and authorizing an end user to apply the named collection including the filter tests to data that the end user selects, compliant with the data source type.

2. The method of claim 1, further including, after the creating the named collection:

invoking an immediate execution mode with the named collection of filter tests, wherein the immediate execution mode accesses data presented by the encapsulated business data objects, without a separate compilation and linking step;

selecting data compliant with the data source type; and viewing the display of the results of the filter tests.

3. The method of claim 1, further including using the power user-layer tools, one or more times, connecting a graphical summary display to the result of a particular filter test.

4. The method of claim 1, wherein at least one of the graphical summary display is a multi-colored indicator, color-coded to convey the result of a particular filter test.

5. The method of claim 1, wherein at least one of the graphical summary display is a gauge with pointer, the pointer indicating the result of a particular filter test.

6. The method of claim 1, wherein at least one of the graphical summary display is a variable-sized indicator, size-coded to convey the result of a particular filter test.

7. An enhanced method of business analysis available within a layered development environment, the method including:

accessing layers of development tools running on a computer, wherein the access is controlled by role-oriented privileges that differentiate at least between builder, power user and end user roles;

using builder-layer tools in the builder role, creating one or more encapsulated business data objects that provide access to raw data, wherein the encapsulated business data objects are presented graphically to a power user without builder-layer details of the raw data sources, further using the builder-layer tools to assign data source types to the encapsulated business data objects;

using power user-layer tools in the power user role, assembling a screen that presents to an end user data selected from the encapsulated business data objects, wherein the power user-layer tools provide access to the encapsulated business data objects by data type and hide from the power user the builder-layer details of the raw data sources; and using end user-layer tools in the end user role, repeating one or more times the following:

defining a further filter to chose among the data selected for the screen using the power user-layer tools;

defining a table calculator using at least one spreadsheet-style function that declares how to calculate a total or other new value from data returned by the further filter; and applying the table calculator to the data returned by the further filter;

wherein the end user-layer tools hide from an end user the details of the raw data sources and of connecting the encapsulated business data objects to the screen.

8. The method of claim 7, wherein the builder-layer tools and the power user-layer tools are accessible from a role that combines builder- and power user-layer features.

9. A computer-implemented software development and execution system, including:

a processor and memory;

logic running on the processor and memory that defines roles for users and differentiates at least between builder and power user roles;

logic running on the processor and memory responsive to the defined roles that controls access to layers of development tools displays, including the following:

builder-layer tools used to create encapsulated business data objects that provide access to raw data, wherein the encapsulated business data objects are presented graphically to a power user without builder-layer details of the raw data sources, and that further are used to assign data source types to the encapsulated business data objects; and power user-layer tools that present a declarative, non-coding interface to construct (a) a filter applicable to select data from the one or more business data encapsulation objects, (b) a calculator applicable to output of the filter, and (c) a filter test applicable to output of the calculator;

wherein the layers of tools can invoke an immediate execution mode that applies the filters and the calculators to data presented by the encapsulated business data objects, without a separate compilation and linking step.

10. The system of claim 9, wherein builder-layer tools are adapted to build encapsulated business data objects that present data from SQL, JDBC, ODBC-accessible databases, Web services sources, and XML objects.

11. The system of claim 9, wherein builder-layer tools are adapted to build encapsulated business data objects that present data from SQL, JDBC, and ODBC accessible databases and JCA, JMS, JMX, JXTA, and EJB objects.

12. The system of claim 9, wherein builder-layer tools are adapted to build encapsulated business data objects that present data from JCA, JMS, JMX, JXTA, and EJB objects, Web services sources, and XML objects.

13. The system of claim 9, wherein builder-layer tools are adapted to build encapsulated business data objects that present data from Excel, Exchange Server, and Access sources.

14. The method of claim 9, wherein builder-layer tools are adapted to define data source types applicable to sets of one or more encapsulated business data objects and the power user-layer tools that construct the filter and the calculator are adapted to apply to data compliant with the data source types.

* * * * *

UNITED STATES PATENT AND TRADEMARK OFFICE

CERTIFICATE OF CORRECTION

PATENT NO. : 7,590,972 B2
APPLICATION NO. : 10/975975
DATED : September 15, 2009
INVENTOR(S) : Jeffrey Axelrod et al.

It is certified that error appears in the above-identified patent and that said Letters Patent is hereby corrected as shown below:

In claim 1, column 21, line 5, please delete “on or more” and insert --one or more--.

Signed and Sealed this

Twenty-seventh Day of October, 2009

David J. Kappos
*Director of the United States Patent and Trademark Office*

UNITED STATES PATENT AND TRADEMARK OFFICE

CERTIFICATE OF CORRECTION

PATENT NO. : 7,590,972 B2
APPLICATION NO. : 10/975975
DATED : September 15, 2009
INVENTOR(S) : Axelrod et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1201 days.

Signed and Sealed this

Twenty-first Day of September, 2010

David J. Kappos

*Director of the United States Patent and Trademark Office*